United States Patent [19]

Smith et al.

[11] 4,265,737
[45] May 5, 1981

[54] METHODS AND APPARATUS FOR TRANSPORTING AND PROCESSING SOLIDS

[75] Inventors: Clay D. Smith; Douglas V. Keller, Jr., both of Lafayette, N.Y.

[73] Assignee: Otisca Industries, Ltd., Syracuse, N.Y.

[21] Appl. No.: 143,160

[22] Filed: Apr. 23, 1980

Related U.S. Application Data

[60] Continuation of Ser. No. 929,803, Jul. 31, 1978, abandoned, which is a division of Ser. No. 561,168, Mar. 24, 1975, Pat. No. 4,173,530, which is a continuation-in-part of Ser. No. 423,577, Jan. 14, 1974, abandoned.

[51] Int. Cl.³ ............................ B03B 5/30; B03B 5/44
[52] U.S. Cl. ........................................ 209/3; 209/11; 209/172; 406/197; 299/8
[58] Field of Search ................. 209/3, 9–11, 209/172; 299/7, 8, 12; 406/109, 197

[56] References Cited

U.S. PATENT DOCUMENTS

| | | | |
|---|---|---|---|
| 449,102 | 3/1891 | Andrews | 406/197 |
| 1,390,230 | 9/1921 | Bates | 44/51 |
| 2,128,913 | 9/1938 | Burk | 406/47 |
| 2,346,151 | 4/1944 | Burk et al. | 406/47 |
| 2,610,900 | 9/1952 | Cross | 406/48 |
| 2,670,078 | 2/1954 | Davis | 209/172 |
| 2,686,085 | 8/1954 | Odell | 406/46 |
| 2,693,950 | 11/1954 | Calder | 299/12 X |
| 2,791,471 | 5/1957 | Clancey et al. | 406/197 |
| 2,791,472 | 5/1957 | Barthauer et al. | 406/49 |
| 2,920,923 | 1/1960 | Wasp et al. | 406/47 |
| 2,937,049 | 5/1960 | Osawa | 406/49 |
| 3,012,826 | 12/1961 | Puff et al. | 406/47 |
| 3,019,059 | 1/1962 | McMurtie | 406/49 |
| 3,073,652 | 1/1963 | Reichl | 110/347 |
| 3,129,164 | 4/1964 | Cameron | 208/8 R |
| 3,168,350 | 2/1965 | Phinney et al. | 406/197 |
| 3,180,691 | 4/1965 | Wunsch et al. | 406/197 |
| 3,190,701 | 6/1965 | Berkowitz et al. | 406/48 |
| 3,206,256 | 9/1965 | Scott | 406/197 |
| 3,359,040 | 12/1967 | Every et al. | 406/48 |
| 3,377,107 | 4/1968 | Hodgson et al. | 406/47 |
| 3,471,204 | 10/1969 | Koch et al. | 406/197 X |
| 3,485,534 | 12/1969 | Wanzenberg et al. | 406/109 |
| 3,524,682 | 8/1970 | Booth | 406/195 |
| 3,637,263 | 1/1972 | Wasp | 406/49 |
| 3,719,397 | 3/1973 | Wasp | 406/49 |
| 3,790,214 | 2/1974 | Kilroy | 299/8 |
| 3,982,789 | 9/1976 | Funk | 209/17 |

*Primary Examiner*—Ralph J. Hill
*Attorney, Agent, or Firm*—LeBlanc, Nolan, Shur & Nies

[57] ABSTRACT

The transporting of solids using selected fluorochlorocarbons as carriers. Techniques of recovering the carrier are also disclosed as are novel solids handling and processing systems in which the compositions employed as carriers are also used to effect a heavy liquid resolution of solids.

9 Claims, 11 Drawing Figures

METHODS AND APPARATUS FOR TRANSPORTING AND PROCESSING SOLIDS

This application is a continuation of application Ser. No. 929,803 filed July 31, 1978 (now abandoned). The latter is a division of application Ser. No. 561,168 filed Mar. 24, 1975 (now U.S. Pat. No. 4,173,530 issued Nov. 6, 1979). Application Ser. No. 561,168 is a continuation-in-part of application Ser. No. 423,577 filed Jan. 14, 1974 (now abandoned).

Our invention relates, in one aspect, to novel, improved techniques for separating coal from the foreign material with which it is found in nature and elsewhere.

Raw or as mined coal commonly contains foreign matter in amounts as high as 20 to 60 percent by weight. Even though the cost of doing so can become relatively high ($1.50 to $4.00 per ton for a product selling at up to $60 per ton), coal is in almost all cases cleaned to rid it of the foreign material prior to use because of: environmental factors, economic considerations such as the cost of hauling unusable material over extended distances, and limitations on the amount of foreign materials which can be tolerated in the process in which the coal is to be used.

Many techniques for cleaning coal have heretofore been proposed; and a number of these are in current commercial use including air separation, jigging, froth flotation, cycloning, and shaking on Diester tables.

There are disadvantages to each of the foregoing techniques for cleaning coal. One common to all of them is that only a narrow size consist can be handled; that is, the coal to be processed must consist of particles in a relatively narrow size range. This may require that the coal be separated into two or more fractions before it is cleaned, adding to the cost of cleaning the coal.

Another disadvantage of currently employed cleaning techniques such as jigging and shaking on Diester tables is that they are often inefficient. Such techniques take advantage of the relative behavior of coal and foreign material in a moving stream of water, and many coals have specific gravities which make dynamic separation inefficient. Many of the coal particles will act like and settle into the bed of foreign material rather than migrating to a separate strata.

Also, hydraulic separation techniques require large quantities of water. This is an important disadvantage, especially in arid regions or where environmental requirements demand that the plant water circuit be completely closed; i.e., that there be no water effluent.

Cyclones are used to only a small extent because of the expense and poor product yield.

Froth flotation is another coal separation technique that has from time-to-time been touted. However, froth flotation requires a degree of sophistication in preconditioning and flotation chemistry that is in most cases not available in the field; and the size consists that can be handled are limited. Accordingly, while efficient when properly carried out, froth flotation is not used to any significant extent.

Another type of coal cleaning process which has been proposed is gravity or sink-float separation. This process takes advantage of the differences in specific gravity between coal (typically 1.25 to 1.55) and the foreign material associated therewith (typically 1.8 to 6.0) to separate the coal.

The coal and foreign matter are introduced into a body of a parting liquid having a specific gravity intermediate that of the coal and the foreign material. By virtue of Archimedes' principle, the coal rises to the top of the parting liquid; and the foreign matter or gangue sinks to the bottom. The two layers of material, respectively termed "floats" and "sinks", are recovered separately from the parting liquid.

Gravity separation using a moving aqueous slurry of magnetite as the parting liquid is in widespread use today.

Like other currently employed techniques, gravity separation as now practiced has significant disadvantages. One is that the coal must be in the form of relatively large particles (typically 10 inches to ¼ inch). Otherwise, the separating velocities of the coal relative to induced or random velocities in the separating vessel will be so small that coal particles will report to the sinks and particles of foreign material will report to the floats.

The requirement that the coal have a minimum particle size on the order of ¼ inch also means that, in many cases, considerable amounts of pyrites may be left in the product coal. In some coals large quantities of pyrites exist in particle sizes as small as $-200$ mesh (this and all sieve sizes referred to hereinafter are of the U.S. Standard series). Therefore, if the coal is only reduced to a ¼ inch particle size prior to gravity separation, large quantities of pyritic sulfur will remain with the product coal.

Another important disadvantage of gravity separation as currently practiced is that fine coal particles or clays, if not completely removed from the plus ¼ inch coal prior to separation, can foul the bath. This increases the viscosity of the bath, resulting in poor separation efficiency and magnetite recovery.

The coal product of the magnetite-water separator must be mechanically or thermally dried or both. Because water has a relatively high boiling point and a high latent heat of vaporization, the cost of drying the coal can be considerable.

Other gravity separation techniques for cleaning coal are described in U.S. Pat. Nos. 994,950 issued June 13, 1911, to DuPont; 2,150,899 issued Mar. 21, 1939, to Alexander et al; 2,150,917 issued Mar. 21, 1939, to Foulke et al; 2,208,758 issued July 23, 1940, to Foulke et al; 2,842,319 issued July 8, 1956, to Reerink et al; 3,026,252 issued Mar. 20, 1962, to Muschenborn et al; 3,098,035 issued July 16, 1963, to Aplan; 3,261,559 issued July 19, 1966, to Yavorsky et al; and 3,348,675 issued Oct. 24, 1967, to Tveter. The gravity separation techniques disclosed in these patents differ from that just discussed primarily in the parting liquids the patentees propose.

Our novel process for cleaning coal is, like those described in the just-cited patents, of the gravity separation type. However, a far superior parting liquid is employed; and, as a result, our process enjoys a number of advantages not possessed by the patented processes.

In particular, we employ as a parting liquid a fluorochloro derivative of methane or ethane (hereinafter referred to as a "fluorochlorocarbon") or 1,2-difluoroethane.

At least 24 derivatives fitting the foregoing description have been reported in the literature. Of these, 16 are of no interest because their boiling points are so low that the cleaning process would have to be refrigerated, which is obviously impractical, or so high that the cost of recovering them from the clean coal and rejects would be prohibitive. In fact compounds in the latter category would be inferior to water-based parting liquids even though they are much more expensive.

The fluorochlorocarbons which we consider suitable because of their boiling points (ca. 40°–150° F.) and other physical characteristics (low viscosity and surface tension and useful specific gravity) and their chemical inertness toward coal and other materials under the process conditions we employ are:
1-Chloro-2,2,2-trifluoroethane
1,1-Dichloro-2,2,2-trifluoroethane
Dichlorofluoromethane
1-Chloro-2-fluoroethane
1,1,2-Trichloro-1,2,2-trifluoroethane
1,1-Dichloro-1,2,2,2-tetrafluoroethane
Trichlorofluoromethane Of the listed compounds, all but the last three are at the present time too expensive to be practical from an economic viewpoint. And, of the latter, trichlorofluoromethane is preferred because of its optimum physical properties, its chemical activity, and its low cost.

Also, this compound has an almost ideal boiling point and an extremely low latent heat of vaporization (87 BTU/lb as opposed to 1000 BTU/lb for water). Accordingly, the compound can be recovered from solids with which it is associated by evaporation with only a modest expenditure of energy.

A principal advantage of our novel process for cleaning coal is effectiveness.

The efficiency of a coal cleaning operation is generally ascertained by a washability study which, in principle, identifies how closely the operation comes to processing the coal to a theoretical level of cleanness. While there is no industry wide standard for performing washability studies, the procedures all have much in common. The coal to be rated is sampled, graded into different fractions by size consist, and subjected to gravity separation in a mixture of hydrocarbons and halogenated hydrocarbons or in an aqueous salt solution for an extended period of time. Characteristics such as yield and moisture, heat value, ash, and sulfur content are then ascertained and reported.

With our novel process, we are consistently able to obtain higher yields and lower ash, sulfur, and moisture contents than are indicated to be theoretically possible by many washability study procedures. This is important from both the economic and ecological viewpoints.

Parting liquids which resemble ours to the extent that they are halogenated hydrocarbons have heretofore been disclosed in the Tveter patent identified above. According to the patentee these parting liquids are suitable for beneficiating coal.

All of the compounds listed in the Tveter patent contain iodine or bromine or both; as a consequence, they have a number of disadvantages.

One is that their boiling points are too high for the compounds to be of any practical value in the processing of coal. A substantial amount of the parting liquid is chemically adsorbed on the particles of the coal and the gangue in any separation process. Economics dictate that this parting liquid be efficiently recovered and that the recovery be effected at low cost.

In our opinion the only practical way to recover the parting liquid at the present time is to do so in vapor form. The energy required to recover high boiling point compounds by this technique makes their use economically impractical. In fact one paper flatly states that direct evaporation is "not applicable" to liquids with high boiling points (Tippin et al, Heavy Liquid Recovery Systems in Mineral Beneficiation, SME TRANSACTIONS, March 1968, pp. 15–21).

Even assuming that they would be effective, other techniques for recovering a halogenated hydrocarbon parting liquid such as washing the floats and sinks with water and then recovering the parting liquid from the wash water (see Baniel et al, Concentration of Silicate Minerals by Tetrabromoethane (TBE), SME TRANSACTIONS, June 1963, pp. 146–154) would likewise be economically impractical, especially in circumstances where the customer's specification requires that substantial amounts of the wash water subsequently be removed from the coal. The same would be true of the even more complicated parting liquid recovery scheme using solvents described in Patching, Developments in Heavy-Liquid Systems for Mineral Processing, MINE & QUARRY ENGINEERING, April 1964, pp. 158–166.

The problems of recovering a parting liquid as disclosed in Tveter are compounded when the solids, like coal, have microcracks, a large volume of pores, and other defects into which the parting liquid can be absorbed. Recovery of such liquid can easily become economically impractical.

Another disadvantage of most of the Tveter compounds is that their specific gravities are too high for them to be of much value for coal beneficiation. Bituminous coals have specific gravities in the range of 1.25–1.55 as indicated above, and parting liquids having specific gravities above 1.70 are of little importance as the amount of gangue which reports to the floats with the coal becomes too high. All of the compounds listed by Tveter have specific gravities above 1.70.

Furthermore, a number of the listed compounds are little more than laboratory curiosities; they are not commercially available at all. Others, which can be purchased from suppliers of rare chemicals in small amounts, are too expensive to be of any value. For example, the price quoted for Tveter's 1,1-dibromo-2,2-difluoroethane is $431 per pound.

Finally the Tveter list includes compounds which are anesthetics (1,2-dibromo-tetrafluoroethane, for example) and narcotics (such as trichloroethylene) and others which have a relative high level of mammalian toxicity such as carbon tetrachloride.

Halogenated hydrocarbon liquids for coal beneficiation are also discussed in Foulke et al U.S. Pat. No. 2,150,917. Their halogenated hydrocarbons include many with the disadvantages discussed above and, to some extent, elaborated upon in O'Connell, Properties of Heavy Liquids, SME TRANSACTIONS, June 1963, pp. 126–132, which also lists still other halogenated hydrocarbons heretofore proposed as parting liquids.

The Foulke et al list also includes compounds such as trichloroethylene and tetrachloroethane which chemically react with coal (carbon tetrachloride is also in this category). Such parting liquids are not useful because the parting liquid and the coal both become contaminated.

Contamination of the parting liquid makes the process economically impractical because of the cost of purifying it and because of the loss of the parting liquid. A commercial scale operation cycles at least several hundred tons per hour of the parting fluid, and loss of even a small proportion of the liquid is accordingly economically significant.

Also, as discussed in the above-cited O'Connell paper, a related disadvantage of many of the heretofore proposed halogenated hydrocarbons is that they adversely react with common construction materials such as mild steel, rubber and other gasket materials, etc. as well as lubricants or decompose into compounds which will so react, especially if moisture is present. Both 1,2-difluoroethane and the fluorochlorocarbons we employ are much less inclined to react with such materials, whether or not moisture is present, which is of self-evident importance.

Coals contaminated with halogen ions are also undesirable. In the case of steaming coals this can cause boiler corrosion. Contaminated coking coals can undesirably alter the chemistry of the reactions in which they are typically employed.

Another advantage of the present invention is that it can be employed in circumstances where the water content of the coal is high. For example, one application where our invention is particularly advantageous is in the cleaning of slurry pond coals. Such coals, drip dried and supplied to the beneficiation apparatus, may have a moisture content as high as 15 percent.

In contrast coal beneficiation processes employing halogenated hydrocarbon parting liquids such as those disclosed in Tveter cannot be employed if the moisture content of the coal exceeds two percent according to the patentee. This makes such processes of little commercial value because only a few coals and anthracites have mined moisture contents this low. Anthracites in toto account for less than one percent of the annula coal production in this country.

Tveter does not stand along in emphasizing that the presence of water is highly deleterious in applications involving the use of halogenated parting liquids. The same point is made in the above-cited Patching article.

Still another advantage of our invention is that the specific gravity of the novel fluorochlorocarbons we employ and 1,2-difluoroethane can be readily adjusted to make the specific gravity of the parting liquid optimum for cleaning a particular coal.

For example, the nominal 1.5 specific gravity of trichlorofluoromethane can be varied within a range of approximately 1.55–1.4 by modest variations of the gravity separation bath temperature and pressure.

Lower specific gravities can be obtained by mixing a diluent such as a light petroleum fraction with the 1,2-difluoroethane or fluorochlorocarbon because of the inertness which such compounds display toward the organic materials in coal and toward the parting liquid and because the parting liquid is miscible in the light petroleum fraction. The same technique can also be employed to maintain the specific gravity of the parting liquid constant or to vary it in a controlled manner under changing ambient conditions.

Petroleum ether (a mixture of pentane and hexane) can be employed in an amount sufficiently small that the vapors from the parting liquid are nonexplosive and non-flammable to reduce the specific gravity of the parting liquid to as low as 1.3 at ambient temperature and pressure. Other liquids can be employed instead of petroleum fractions. Pentane, for example, has the properties which makes is useful for this purpose—a low boiling point and a low heat of vaporization.

The use of hydrocarbon diluents to adjust the specific gravity of a parting liquid has heretofore been suggested in U.S. Pat. Nos. 2,165,607 issued July 11, 1939, to Blow and 3,322,271 issued May 30, 1967, to Edwards.

However, the diluents described in these patents—benzene (boiling point 80 plus °C.) and petroleum fractions with boiling points in the 70°–100° C. range—boil at too high a temperature for them to be useable in our coal cleaning processes which require that the diluent boil at a temperature as nearly as possible the same as that of the fluorochlorocarbon or 1,2-difluoroethane.

For this reason even the next higher homolog of pentane with its boiling point of 68° C. is undesirable. And if we employ a petroleum ether, we preferably employ one having a boiling point toward the lower end of the range which such petroleum fractions have (40°–60° C.).

In general the lowest specific gravities that would be useful for our purposes are 1.40 to 1.30. Specific gravities in this range can be obtained by mixing with $CCl_3F$, for example, from 7.7 to 16.4 weight percent of a petroleum ether based on the total weight of the parting liquid.

Another advantage of the novel parting liquids we employ is that they have viscosities which are low even in comparison to other liquids heretofore used as parting liquids in gravity separation processes as shown by the following table:

TABLE 1

| Parting Liquid | Viscosity (Centipoises at 20° C.) |
|---|---|
| Carbon tetrachloride | .969 |
| Tetrachloroethane | 1.844 |
| Methylene bromide | 1.09 |
| Water | 1.00 |
| Tetrabromoethane | 12.0 |
| Bromoform ($CHBr_3$) | 2.152 |
| −325 Mesh Magnetite and water (1.6 specific gravity - production bath survey) | 6–40 (average 12.0) |
| Trichlorofluoromethane | 0.4 |

Low viscosity is important because the velocity at which the particles move through the parting liquid and, therefore, the speed at which beneficiation proceeds is inversely proportional to the viscosity of the parting liquid—as the viscosity of the parting liquid is lowered, the speed of the separation process increases.

In our process separation is completed in 1.0 to 5.0 minutes depending upon the size consist of the coal and refuse even when the top size is less than 100 mesh. In contrast separation in the carbon tetrachloride, bromoform, and ethylene dibromide typically used in standard washability studies may require 2 to 24 hours.

Other advantages of low viscosity parting liquids are discussed in U.S. Pat. No. 3,098,035 issued July 16, 1963, to Aplan.

Our novel parting liquids are also superior to others heretofore proposed and employed because they have lower surface tensions. For the liquids listed above, the surface tensions are:

TABLE 2

| Parting Liquid | Surface Tension (dyne/cm) |
|---|---|
| Carbon Tetrachloride | 27 |
| Tetrachloroethane | 36 |
| Methylene Bromide | 40 |
| Water | 75 |
| Bromoform | 41.5 |
| −325 Mesh magnetite and water | 75 |
| Trichlorofluoromethane | 18 |

Surface tension is important because wetting ability is a function of low surface tension. If the coal is not completely wetted by the parting liquid, air will be trapped on both the coal and gangue particles, making them tend toward a common density. As a consequence, separation becomes more difficult and less efficient.

The problem is particularly acute for particle sizes of one millimeter or less. Yet the presence of such particles may not be avoidable as in the recovery of coal from slurry ponds, for example.

The novel parting liquids we employ have surface tensions so low that the free surfaces of even very small particles, including micro cracks, are essentially instantaneously wetted. This is one reason that we are able to attain separation efficiencies which often exceed those predicted by theoretical washability curves.

Another advantage of our invention is that there is no need to separate the raw coal into large and small particle consists as is necessary in presently employed coal cleaning processes. Lumps of 5–6 inches and larger in diameter can easily be handled as can those 325 mesh and smaller although separation times are longer (up to several minutes) for these smaller particles.

In general, therefore, the only restrictions on particle size are those imposed by the material handling equipment available and by the size to which the raw coal must be reduced to liberate the impurities necessary to meet product specifications.

Also, essentially all of the parting liquid can be recovered. This not only makes the process viable from the economics viewpoint but has a decidedly favorable environmental impact. No contaminated water or other ecologically detrimental chemicals are discharged from the process.

Other advantages of the novel parting liquids we employ are that they are non-flammable, odor free, and non-toxic.

Yet another advantage of our process is that, as far as we can observe, there is no tendency for slimes to form even in circumstances where significant amounts of clays are present. This is important because the control of slimes in other gravity separation processes is a pressing problem as evidenced by the discussions of the problem in the above-identified Aplan patent and in U.S. Pat. No. 2,136,074 issued Nov. 8, 1938, to Crawford et al.

Nor have we seen any evidence of flocculation and/or rafting. That flocculation can be a problem in other gravity separation processes is apparent from Tveter and U.S. Pat. No. 3,308,946 issued Mar. 14, 1967, to Mitzmager et al.

The only reference known to use which suggests that a fluorochlorocarbon be used as a parting liquid is U.S. Pat. No. 3,322,271 issued May 30, 1967, to Edwards. This patent avers that 1,1,2-trichloro-1,2,2-trifluoroethane can be used as a parting liquid to separate tea stalks from tea leaves although there is nothing in the patent such as a working example which shows that this can actually be done.

Even more important the teachings of Edwards would lead one to believe that this compound would not be useful for gravity separation of coal. The patentee suggests that 1,1,2-trichloro-1,2,2-trifluoroethane and the other liquids listed in the patent (trichloroethylene, perchloroethylene, and carbon tetrachloride) are all equivalents as parting liquids. However, all of these other liquids are known to dissolve and chemically react with coal which is highly undesirable for the reasons discussed above. As it is associated in the Edwards patent only with liquids which are not suitable for coal beneficiation, one would not expect 1,1,2-trichloro-1,2,2-trifluoroethane to be useful for that purpose.

A fortiori, there is nothing in Edwards which would even remotely suggest that 1,1,2-trichloro-1,2,2-trifluoroethane would have the unexpected advantages in cleaning coal which we have found it does. There is nothing in the patent to indicate that this compound would effect the removal of organic sulfur from coal, that it would cause water associated with coals of high water contents to report to the sinks or rejects, or that the liquid could be recovered from the coal in almost quantitative proportions with only very modest expenditures of energy.

There is also an allegation that "fluorine substituted . . . alkyl compounds" can be used as parting liquids in U.S. Pat. Nos. 3,802,632 issued Apr. 9, 1974, and 3,746,265 issued July 17, 1973, both to Dancy. However, no specific compounds are named; and, as discussed above, only a handful of the many compounds meeting this description are suitable for our purposes.

Although not essential, we prefer to prewet or condition the coal to be cleaned with a mixture of a fluorochlorocarbon or 1,2-difluoroethane and an ionic surface active agent prior to introducing it into the gravity separation bath. This conditioning with the combination of ionic surface active agent and fluorinated hydrocarbon has unexpectedly been found to cause significant proportions of the surface water which would be expected to remain with the coal to instead report to the sinks.

The removal of water to the sinks is particularly important in the processing of coals of higher water content as the redistribution of the water in the system can simplify, and even eliminate, subsequent dewatering of the coal.

More specifically, coarse product coal typically has a moisture content of 4–7 percent while that of fine product coal can range from 10–30 plus percent. Moisture contents in the latter range and the upper end of the first-mentioned range both reduce the efficiency with which the coal can be burned and generate handling problems. For example, entire carloads of coal of such moisture content can freeze into a single lump in freezing temperatures, making it tremendously difficult to unload and handle the coal.

Larger sizes of coal are conventionally dewatered on shaker screens or conical screens. Smaller size consists are customarily dewatered in a basket type centrifuge and still smaller particles in solid bowl centrifuges. Alternatively, coal can be thermally dewatered; that is, heated to a temperature high enough to evaporate part or all of the moisture. Fluidized bed dryers are customarily employed for this purpose.

By reducing the need for dewatering by the techniques just described our novel coal cleaning process generates corresponding savings in capital investment for equipment, in operating costs, and in expenditures of energy.

Another advantage of conditioning the coal to be cleaned with our novel combination of 1,2-difluoroethane or a fluorochlorocarbon and a surface active agent is that this results in a greater reduction in the sulfur content of coal than can be obtained by other processes for which data on reductions in sulfur content have been reported. Maximum removal of sulfur is important because the sulfur contents of coals found in the United States range as high as seven to ten percent while, preferably, coking coals contain no more than 1.3 percent sulfur; and government standards proposed for the late 1970's would limit many steaming coals to a sulfur content in the range of 0.5 percent.

Three types of sulfur can be present in coal. These are:

(a) Pyritic sulfur—$FeS_2$, density 4.9 $g/cm^3$;

(b) Sulfate sulfur—usually calcium sulfate resulting from the reaction of water and pyrites to form sulfuric acid and the subsequent reaction of the acid with calcium carbonate associated with the coal; and (c) Organic sulfur—sulfur bound with carbon atoms in the coal matrix into molecules of organic character. Discrete compounds have not as yet been positively identified, but organic sulfide and sulfone linkages appear to be present. In chemical analyses of coal, total, pyritic, and sulfate sulfur are measured; and the difference between the latter two and total sulfur is reported as organic sulfur.

Pyritic sulfur particles as small as 0.01 inch in diameter are common. As discussed above, even particles of this minute size can be efficiently removed by our novel process when they are released from the coal because the excellent wetting properties of the parting liquids we employ make it feasible to use a size consist of this magnitude in the beneficiation process. In contrast, conventional hydrobeneficiation becomes inefficient to an increasing and dramatic degree as particle sizes decrease below 0.2 inch in diameter and becomes totally inoperable at particle sizes lower than 0.2 inch in diameter. Therefore, hydrobenefication techniques are inherently incapable of removing as much of the pyritic sulfur which may be present in a particular raw coal as our process.

We have also found that, surprisingly, a reduction in organic sulfur can be obtained by our novel process. This has been ascertained by evaporating used parting liquid to dryness and making an infrared analysis of the residue. There is evidence that some organic sulfur also reports to the sinks (gangue) in our process.

Hydrobeneficiation, in contrast, does not alter the organic sulfur concentration of the raw coal under any conditions.

In fact, to our knowledge, the only heretofore available techniques for removing organic sulfur from coal are pyrolytic. Such techniques are not usable in cleaning coal generally because of the energy expended in heating large tonnages of coal to the requisite temperature and because of the alteration in the chemical composition and the structure of the coal which results.

We have also found that the use of surface active agents in our novel process increases the quality of the separation when wet coal—that is, coal with a moisture content as high as 25 percent—is being cleaned. This is entirely unexpected because of the insistence by Tveter that halogenated hydrocarbon/surfactant mixtures cannot be used to clean coal with a moisture content of more than two percent; that is, that they are only useful in cleaning dry coal.

Water effects other gravity separation type coal cleaning processes because it forms on the coal particles a thin film to which small particles of more dense foreign material can adhere. This creates "agglomerates" which may have a specific gravity greater than the parting liquid, causing them to report to the sinks (gangue) rather than the floats (product coal) if the coal particles are small. Conditioning the coal as described above apparently makes our novel parting liquids capable of rupturing these thin films, thus preventing the formation of agglomerates.

This phenomenom is particularly apparent in the reclaiming of coal from slurry ponds. When cleaned in accord with the technique just described, even ultrafine clay particles are separated from the coal.

Also, there is evidence that part of the pyritic sulfur present in some coals is bonded to the coal particles by forces (probably electrostatic and less likely thin film) which can be neutralized by those combinations of parting fluids and additive described above. We are in any event able to obtain reductions in pyritic sulfur content which indicate that pyrite particles smaller than those liberated by fine grinding are being separated from the raw coal.

Among the surface active agents we have successfully employed are the following:

TABLE 3

| Surface Active Agent | Type | Composition | Manufacturer |
| --- | --- | --- | --- |
| Aerosol OT-100 | Anionic | Dioctyl ester of sulfosuccinic acid | American Cyanimid |
| Aerosol OT-75 | Anionic | Dioctyl ester of sulfosuccinic acid | American Cyanamid |
| Cal Supreme Perk-Sheen | Cationic | Dioctyl ester of sulfosuccinic acid | Penwalt-Caled Company Adco, Inc. |
| Super-Cal | Anionic | Dodecyl benzene sulfonic acid salt | Penwalt-Caled Company |
| Pace-Perk | Anionic | Dodecyl benzene sulfonic acid salt | Penwalt-Caled Company |
| Strodex Super V-8 | Anionic | Complex organic phosphate esters | Dexter Corporation |
| Strodex P-100 | Anionic | Complex polyphosphate ester acid anhydride | Dexter Corporation |
| Witconate P10-59 | Anionic | Amine salt of dodecylbenzene sulfonic acid | Witco Chemical Corporation |
| Witcomine | Cationic | 1-Polyaminoethyl-2n-alkyl-2-imidazoline | Witco Chemical Corporation |
| Triton Gr-7M | Anionic | Dioctyl sodium sulfonate plus solvent | Rohm and Haas |

Anionic surface active agents are preferred as are those which are a single compound rather than a blend. Blends tend to be less effective on a unit weight basis, apparently because they tend to emulsify the water on the coal rather than removing it to the sinks.

Small amounts of the surface active agent are lost, probably with the water removed to the rejects. However, the cost of lost material is not expected to exceed $0.30 per ton of coal; it will in general be substantially less.

The amount of surface active agent used will depend upon the particular additive which is selected and the size consist and moisture content of the coal, but will typically range from six pounds per ton for ultrafine coals with high moisture contents down to 0.03–0.05 pounds per ton for coarser coals of lower moisture content.

Agitation of the coal in the conditioning step has also been found to be advantageous. This can be accomplished by mechanical folding of the liquid, coal mixture.

We can also employ No. 4 or No. 6 fuel oil or certain alkyl amines as surface active agents instead of the compositions just described. Mixtures employing these compositions produce essentially the same results as those using compositions more conventionally thought of as surface active agents though less effectively.

No. 4 and No. 6 fuel oils are both employed in an amount ranging from 0.5 to 6 pounds per ton of coal.

Alkyl amines can be employed in amounts ranging from 0.05 to 0.5 pounds per ton of coal. Examples of satisfactory amines are: diethylamine, ethylene diamine, and monoethyl amine.

The use of surfactants in gravity separation processes has heretofore been discussed in Blow, Tveter, Aplan, Foulke et al U.S. Pat. No. 2,208,758, and in U.S. Pat. No. 2,899,392 issued Aug. 11, 1959, to Schranz. The Blow and Schranz patents, however, are not concerned with the cleaning of coal; and there is nothing in either patent which would leave one to believe that surfactants could be used to advantage in coal cleaning processes. Foulke et al chose surfactants which would fix the water film on the material being recovered rather than freeing it from the material for removal to the sinks. This class of surfactants has completely different properties than those we employ and, moreover, properties we consider undesirable.

The parting liquids with which Aplan is concerned are aqueous suspensions of solid particles. The patent discloses nothing regarding parting liquids which are combinations of 1,2-difluoroethane or liquid fluorochlorocarbons and surface active agents and their advantages.

Much the same is true of Tveter. The parting liquids disclosed in that patent are not fluorochlorocarbons. The latter have a number of advantages over the Tveter parting liquids as discussed above; and moreover, there is nothing in the patent which would lead anyone to believe that any advantage would accrue from combining surface active agents with such parting liquids, let along that this would increase the sulfur or fine particle removing capabilities of such compounds.

Furthermore, Tveter is concerned in his use of surfactants only with inhibiting floc formation. This would not lead one to use a surface active agent in the manner and for the purposes we do.

Furthermore, the foregoing patents are for the most part concerned with the use of surface active agents for slime control and to stabilize heavy medium suspensions of solids and not with the removal of water from the product to the rejects in a gravity separation process.

Nor is the surface active agent employed in a conditioning step as it is in our process. It is instead added to the parting liquid in the gravity separation bath. Our technique has the advantage that amount, exposure, and time factors can be optimized independent of the separation stage.

In another aspect our invention resides in the provision of novel improved techniques for moving coal and other solids from place-to-place and, more particularly, to the use of 1,2-difluoroethane and fluorochlorocarbons as described above for this purpose.

Coal is commonly transported in the form of an aqueous slurry because this is the product of the coal beneficiation process.

We have now discovered that this advantage can be retained and additional advantages obtained by employing a 1,2-difluoroethane or fluorochlorocarbon carrier.

Specifically, because these compounds have lower viscosities than water, slurries in which they are used as the carrier liquid can be pumped with less power than water-based slurries with the same solids content. Or, viewed otherwise, the solids content of the slurry can be increased for a given power output. From both points-of-view the significant factor is that the cost per unit weight of moving the coal or other solids is lower.

In addition, because the liquids we employ are chemically inert in most circumstances, the corrosion problems attendant upon the use of water in circumstances where soluble minerals are present are avoided. Furthermore, our carrier liquids do not cause the flocculation problems which water may.

Also, as when they are used in our novel beneficiation process, their lower latent heat of vaporization and lower boiling points permit the liquids we employ to be removed at the terminal point with less energy and therefore at a lower cost than water.

Even at that, however, we find it necessary to add heat to the slurry to recover the carrier liquid. Also, a vacuum or gas purge is required as, otherwise, so much carrier liquid will remain in the pores of the coal particles as to make the process impractical.

The precise temperature to which materials are heated to remove a carrier liquid associated therewith in our novel process for transporting coal and in the other novel processes described herein which employ a carrier liquid removal step will vary from application-to-application and will depend upon a number of factors. Among these are the boiling point of the carrier, the removal rate required to maintain equilibrium in the system, etc. In a typical application using trichlorofluoromethane, however, a drying or liquid removal temperature of 100° F. (25° F. above the boiling point of the liquid) will be employed.

In addition, because of the physical characteristics of the carrier liquids we employ, coal particles do not tend to pack in the carrier liquid to the extent they do in water. Accordingly, even after it has remained static for an extended period, flow can be initiated almost instantaneously in a slurry formed according to the present invention.

Numerous patents disclose techniques for transporting aqueous slurries of coal. Among these are U.S. Pat. Nos. 449,102 issued Mar. 31, 1891, to Andrews; 2,128,913 issued Sept. 6, 1938, to Burk; 2,346,151 issued Apr. 11, 1944, to Burk et al; 2,686,085 issued Aug. 10, 1954, to Odell; 2,791,471 issued May 7, 1957, to Clancey et al; 2,791,472 issued May 7, 1957, to Barthauer et al; 2,920,923 issued Jan. 12, 1960, to Wasp et al; 3,012,826 issued Dec. 12, 1961, to Puff et al; 3,019,059 issued Jan. 30, 1962, to McMurtie; 3,073,652 issued Jan. 15, 1963, to Reichl; and 3,524,682 issued Aug. 18, 1970, to Booth.

Other carrier liquids have been proposed. These, typically, are liquid petroleum fractions used alone or with water, etc. Exemplary of processes employing such carrier liquids are those disclosed in U.S. Pat. Nos. 1,390,230 issued Sept. 6, 1921, to Bates; 2,610,900 issued Sept. 6, 1952, to Cross; 3,129,164 issued Apr. 14, 1964, to Cameron; 3,190,701 issued June 22, 1965, to Berkowitz et al; 3,206,256 issued Sept. 14, 1965, to Scott; 3,377,107 issued Apr. 9, 1968, to Hodgson et al; and 3,359,040 issued Dec. 19, 1967, to Every et al.

The use of a heavy liquid as a carrier for coal is suggested in U.S. Pat. No. 2,937,049 issued May 17, 1960, to Osawa. However, in the Osawa technique the carrier liquid is employed to float the coal to the top of a vertical shaft and is therefore of limited applicability. Furthermore, the heavy liquids proposed by this patentee (aqueous dispersions of silt plus pulverized pyrite, hematite, limonite, magnetite, ferrosilicon, or galena) would be unsuitable for pipeline transport because they are highly abrasive if for no other reason.

Wasp (U.S. Pat. Nos. 3,637,263 issued Jan. 25, 1972, and 3,719,397 issued Mar. 6, 1973) does suggest that aqueous coal slurries containing magnetite, magnesite, barites, hematite, etc. can be used for the pipeline transportation of coal. However, we consider this technique inferior because of the abrasion problem discussed above. Also, the recovery of the carrier at the terminus, the drying of the coal, and the return of the carrier liquid is a much more complex and expensive procedure than we find necessary.

There is one patent of which we are aware that suggests using a fluorochlorocarbon as the carrier for a coal slurry. This patent is U.S. Pat. No. 3,180,691 issued Apr. 27, 1965, to Wunsch et al.

However, one of the fluorochlorocarbons which Wunsch et al propose to use (dichlorodifluoromethane) boils at −30° C. Accordingly, the pressure in the pipeline must be kept at 77 psig simply to keep the fluorochlorocarbon liquid at room temperature (72° F.) and at 106 plus psig to keep the carrier liquid at the easily reached summertime temperature of 95° F. We consider this undesirable because of the energy required, the problem of sealing the line against leakage engendered by the large pressure differential, and the difficulty there would be in effecting movement of the solids if any significant amount of the carrier were lost.

Wunsch et al also suggest that trichlorofluoromethane can be used as the carrier liquid in their coal transport process. We disagree because, in their process, the carrier liquid is removed from the solids by evaporation at ambient temperature and pressure which means that the latent heat of vaporization must be supplied by the solids and from the ambient surroundings.

As a practical matter, the bulk of the heat must come from the latter source. For example, if the solids were to supply all of the sensible heat required to evaporate trichlorofluoromethane from a slurry composed of equal parts by weight of carrier and solids, the solids would have to decrease 283° F. in temperature, an obvious impossibility as the temperature of the solids may not be much above ambient temperature when the slurry reaches the terminus.

Trichlorofluoromethane vaporizes at ca. 75° F. at atmospheric pressure. As a coal transport process has to be capable of operating on a twenty-four hour basis to be of any practical value and as the temperature differential between the ambient surroundings and the boiling point of the carrier liquid must be significant for evaporation of the liquid to proceed at an appreciable rate, the Wunsch et al process using trichlorofluoromethane as the carrier liquid would be operable only where the round-the-clock ambient temperature at the terminus exceeds 75° F. by a significant margin. As such conditions exist only in controlled environments and in a few tropical locations (see, for example, Handbook of Fundamentals, American Society of Heating, Refrigerating, and Air Conditioning Engineers, 345 East 47th Street, New York, N.Y., 1972, pp. 667–688), the process in question has little if any practical value.

In contrast, our novel process for transporting coal is essentially independent of the ambient temperature at the terminus. It can be used in Arctic and tropical conditions and in any conditions ranging therebetween.

Another disadvantage of the Wunsch et al process if trichlorofluoromethane or a comparable carrier liquid is employed is that recovery of the carrier by evaporation under ambient conditions, alone, will leave a large proportion of the carrier liquid in the pores of the solids. In the case of a typical coal this would be on the order of six pounds of carrier per ton of coal. As trichlorofluoromethane currently sells for $0.30 per pound, the cost of unrecovered carrier liquid would be $1.80 per ton of coal transported. This would make the process economically impractical.

In contrast, our novel use of a purge at the terminus results in the recovery of essentially all the carrier liquid from the slurry. Because of this and other factors, our novel process is highly viable from the economic viewpoint. For example, we can typically reduce the carrier content of the coal to on the order of 20 percent by drip drying, a technique not disclosed in Wunsch et al. Drip drying can reduce the energy required to remove the carrier liquid by as much as 60 percent or more depending upon the particular application of our invention.

It is sometimes advantageous to incorporate additives into coal to modify its properties. For example, recent studies have shown that the addition of quicklime (chiefly calcium oxide) or calcined dolomite (chiefly calcium-magnesium oxide) to coal brings about a significant reduction in the sulfur content of the combustion products generated when the coal is burned.

In still another aspect our invention involves a novel technique by which a virtually unlimited variety of additives can be easily, economically, and uniformly dispersed in coal.

Briefly, we dissolve or disperse the additive or additives in a fluorochlorocarbon as described above or 1,2-difluoroethane; immerse the coal in or spray or drench it with the carrier, additive composition, or otherwise effect contact between the coal and the composition; and then remove the carrier, leaving the additive absorbed in and/or adsorbed on the free surfaces of the coal particles.

In processes also involving a coal cleaning step the additive can in some cases be dispersed in the parting liquid bath in the gravity separator or in the parting liquid mixed with uncleaned coal in a conditioning step. Alternatively, the additive can be distributed in a unit downstream from the gravity separator.

Our novel technique for incorporating additives is highly effective because the low viscosity and surface tension of the fluorochlorocarbon or 1,2-difluoroethane carriers permit them to penetrate and transport the additives into even the smallest pores and micro cracks in the coal particles.

Another advantage of our novel dispersing process, attributable to the physical properties of the carrier liquid, is that the carrier can be easily, inexpensively, and essentially completely recovered after the dispersion of the additive has been completed.

Also, the process can be carried out at ambient temperature and at atmospheric pressure. Because of this and the lack of toxicity and corrosiveness possessed by our carrier liquids, exotic and expensive equipment is not required.

Yet another advantage of our novel technique, in a multi-step operation, is that the coal need not be freed of the parting liquid employed in the cleaning step before the additive is dispersed. This is because both the carrier and parting liquids may be 1,2-difluoroethane or the same, or compatible, fluorochlorocarbons, making removal of the parting liquid unnecessary.

Yet another advantage of our novel method of dispersing additives is that no water is introduced into the system. This is important, as an example, in the addition of quicklime to coal to reduce sulfur emissions. The reaction $$CaO + H_2O \rightarrow Ca(OH)_2$$

is highly exothermic and, also, reduces the availability of one of the reactants needed for the subsequent sulfur removal reaction. By avoiding the introduction of water into the product our novel process insures that the reactant is available in its more reactive form to the maximum extent.

Other exemplary applications where our novel technique for dispersing additives can be employed to advantage are the dustproofing and waterproofing of coal and the addition of a binder as a preliminary to low-temperature briquetting.

The addition of a dustproofing agent is particularly important. In transporting coal of smaller size consists by rail 1–10 percent of the coal is not uncommonly lost between the preparation plant and the point-of-use. By dustproofing coal in accord with our invention, this loss can be substantially reduced.

One exemplary technique for dustproofing coal in accord with the present invention involves the distribution of fuel or residual oil on the coal to coalesce the finer particles into agglomerates. Amounts in the range of 0.05 to 0.5 percent based on the weight of the coal will typically be employed, depending upon the size consist of the coal.

The dustproofing agent is first dispersed in the fluorochlorocarbon or 1,2-difluoroethane carrier in an amount ranging from 0.1 to 5 weight percent based on the weight of the carrier. The coal is immersed in the composition and the carrier removed by evaporating it.

The removal of the carrier leaves the oil residue on the coal surface. This causes agglomeration, substantially reducing the proportion of dust-size particles present.

The application of our novel process for dispersing additives to the waterproofing of coal is also important.

As indicated above, as mined coals may have moisture contents as high as 29–33 percent. If these coals are shipped with a moisture content of this magnitude, almost one-third of the freight charges paid by the shipper are for transporting water. To compound the problem, coals with water contents of the high magnitudes in question are typically young Western coals and must be shipped relatively long distances to the point-of-consumption.

However, it has not heretofore been practical to remove the water from the coal before shipping it. Readsorption of water often occurs so rapidly, especially if the coal is exposed to precipitation, that spontaneous combustion occurs because of the build-up in temperature due to the heat of adsorption. Entire carloads of coal have been destroyed in this manner.

In accord with out invention the coal is dried and the free interior and exterior surfaces coated with a waterproofing agent such as a crude oil or other heavy bitumen by immersing the dried coal in or otherwise intimately contacting it with a dispersion of the waterproofing agent in 1,2-difluoroethane or one of the fluorochlorocarbons listed above. The carrier liquid is then removed, leaving a thin film of waterproofing agent on the exterior surfaces of the coal and on those inner surfaces which are accessible to liquids. This keeps water from readsorbing onto the surfaces accessible to it, and spontaneous combustion cannot occur.

Further benefits are that oxidation and slaking of the coal are effectively inhibited by the coating of waterproofing agent as is the freezing together of the coal under low ambient temperature conditions. All of the foregoing benefits are of course realized in the storing of coal as well as in transporting it.

Processes for treating coal to keep the particles from freezing together are known. One such process is described in U.S. Pat. No. 3,794,472 issued Feb. 26, 1974, to Macaluso et al. However, in the Macaluso process, the coal is sprayed with substantial quantities of water (up to 68 percent of the coating composition). This water would be absorbed by the coal to a large extent. Therefore, even if the coal particles were thereafter surrounded with films which would entrap surface water and keep it from freezing the particles together, the other problems appurtenant to the presence of absorbed water, such as spontaneous combustion, would not be solved as they are by our novel waterproofing technique which not only does not add water to the coal but prevents the coal from reabsorbing water.

The making of briquettes, mentioned above, is another important application of our additive dispersing process.

In briquetting coal, small particles treated with a binder such as No. 6 fuel oil by use of the technique just described are compacted in a mold at room temperature and under moderate pressure (2000 to 5000 psi depending upon the binder, size consist, and moisture content). The resulting briquettes are stable, even under relatively high impacts; and the process is economical.

U.S. Pat. No. 3,027,306 issued Mar. 27, 1962, to Muschenborn et al discloses a process for making briquettes which, like ours, involves a gravity separation step and the use of a binder. However, Munschenborn et al use carbon tetrachloride or a magnetite suspension as the parting liquid. These have major disadvantages, discussed above, and furthermore, would not be useful as a carrier for the binder as our novel parting liquids are. In addition, Munschenborn et al find it necessary to coke the coal before cleaning it, a step we need not employ.

Additives can be dispersed on solids other than coal by the process just described. For example, this process can be used to dedust sinks generated in a coal cleaning operation, ash generated in burning steaming coal, etc. Still other solids can be treated by our process as will be readily apparent to those skilled in the relevant arts.

Rejects can be treated in the gravity separator, in a conditioning step, or in a separate unit after they are removed from the gravity separator. In applications which do not involve a cleaning operation the solids are necessarily treated in a unit provided especially for this purpose.

As indicated above, a virtually unlimited range of materials can be dispersed by our process. One restriction on the additive is that it be soluble or otherwise uniformly dispersable in the carrier liquid. A second limitation in some cases is that the additive not react chemically with the carrier liquid.

In yet another aspect our invention resides in the provision of a novel, integrated process for handling coal from the mine face to a consumption point or other terminus in which the bgeneficiation and slurry transport techniques described above are employed.

Mining machines of the hydraulic or continuous type may be employed in our novel system. The mined coal is crushed and transported away from the mine face in a slurry with 1,2-difluoroethane or one of the liquid fluorochlorocarbons identified above rather than by the conventional belt, shuttle car, or other mechanical arrangement. The fluorochlorocarbon or 1,2-difluoroethane and additive system is also employed for dust suppression at the mine face as such compounds are more effective than water for this purpose. In addition, the fluorochlorocarbon or 1,2-difluoroethane, perhaps with an appropriate additive such as No. 6 fuel oil and/or one or more alkyl amines, can reduce cutter wear and energy requirements.

The coal slurry can be pumped to a primary cleaning plant, typically located in the mine itself. Here, an initial gravity separation of the foreign matter and raw coal is made as described above.

The gangue separated from the coal is stripped of parting liquid, optionally treated with a dust suppressant, and conveyed to a mined-out area of the mine.

The floats from the initial separation step, slurried in the parting liquid, are pumped to a final treating plant, typically located aboveground at the mine mouth. There the coal is ground to a size which will release the maximum amount of foreign material and subjected to a second gravity separation, again using a fluorochlorocarbon or 1,2-difluoroethane parting liquid in accord with the principles of the present invention.

Sinks from this step are stripped of parting liquid and conveyed to a disposal area. They may first be treated to inhibit the generation of acidic group water and/or other ecologically undesirable phenomena.

Floats (or, product coal) from the final cleaning step, again slurried with the parting liquid, may be pumped to the point of consumption, typically a power generating plant, and stored. Prior to use they are stripped of the parting/carrier liquid and, if necessary, ground to a smaller size consist.

Liquid stripped from the coal in the final preparation step can be employed to slurry ash from the power plant furnace bottoms and fly ash precipitators and convey it back to the final cleaning plant. Here, the ash is stripped of the carrier, treated as required, and conveyed to the refuse area with the gangue separated in the final cleaning step. The liquid is recycled, typically to the raw coal slurry pump and to the mine face.

The advantages of using 1,2-difluoroethane or a fluorochlorocarbon as a dust suppressant at the mine face were discussed above. Because of these and the other advantages of our novel materials such as lack of corrosiveness, toxicity, and flammability, explosion hazards are reduced and safety otherwise promoted by our novel system.

Explosion hazards are also reduced because the system is essentially closed, beginning at the mine face. Accordingly, methane and other combustible gases (i.e., firedamp) can be captured and removed from the mine face as well as from the coal during beneficiation, transportation, and storage to a point where they can be safely disposed of or recovered if the concentration warrants.

Another potential advantage of the novel coal mining and handling system just described is that only a small fraction of the gangue is removed from the mine. This materially reduces the material handling capacity and energy required and, also, the aboveground disposal problems.

A related advantage is that the disposal of refuse from the power generating plant or other consumer of the product coal is simplified.

Also, if quicklime is mixed with the coal to suppress sulfur emissions as described above, the refuse from the generating plant will tend toward a basic pH. The presence of this refuse in the refuse pile with pyrites and other acid forming rejects from the cleaning operations will tend to neutralize any acids formed by water contacting the refuse pile, thus reducing the ecological hazards which such refuse piles commonly present.

Other related advantages of our invention are that the conveyor system in the mine occupies less room and can more conveniently be relocated and extended than conventional conveyor systems.

A further significant advantage is that the coal is protected against oxidation from the time it is mined until it is consumed. This gives it potentially better combustion characteristics than conventionally handled coal and, also, minimizes the losses in heating value which can occur through oxidation.

Furthermore, the area required for coal storage at the point of consumption is considerably reduced as is the fire hazard; and there is not need for compaction or dust suppression.

In addition all the underground and surface activities, including material handling and transportation, are independent of weather and climate.

Other advantages of our novel, integrated, coal handling and processing technique, attributable to the nature of the parting, carrier liquids we employ, were described above in conjunction with the coal cleaning and transporting aspects of the invention.

Another important advantage of our novel system is that the advantages at one stage carry over to other stages. For example, because the use of a fluorochlorocarbon or 1,2-difluoroethane in conveying the product coal from the final cleaning station to the point of consumption inhibits oxidation, the coal may be ground for the cleaning step to a size consist which will optimize the separation of pyrites and other foreign material from the coal without regard to the increase in surface area and the accompanying potential for chemical reaction which results.

It will be appreciated by those conversant in the relevant arts that our novel coal handling and processing system is not limited in application to operations where the coal is to be burned at the mouth of the mine. The coal recovered from the final cleaning plant can instead be transported elsewhere in slurry with the parting liquid or, after the latter is stripped from the coal, by conventional mode of transport.

Also, it will be readily apparent to those to whom this is addressed that, with easily visualized modifications, the novel integrated system just described can be used in association with open pit as well as deep mines.

Yet another important advantage is that the system can, to a large extent, operate automatically and unattended.

In yet another aspect our invention resides in certain novel techniques for recovering from coal and refuse the fluorochlorocarbons or 1,2-difluoroethane employed as carriers and as parting liquids. The fluorochlorocarbon or 1,2-difluoroethane may be stripped from the coal or refuse by a vacuum purge or simple evaporation. It is then compressed, condensed, purged of noncondensible gases, and recycled.

Alternatively, the hydrocarbon is stripped from the coal or refuse by evaporation and an air purge. The gas, vapor mixture is compressed and condensed, converting the fluorochlorocarbon or 1,2-difluoroethane to a liquid and leaving the air as a gas. Additionally fluorochlorocarbon or 1,2-difluoroethane can be recovered by compressing and refrigerating the noncondensibles, and the purge air can be recycled.

An air purge is also employed in a third recovery technique. The air and fluorochlorocarbon or 1,2-difluoroethane mixture is compressed and/or condensed and the noncondensible vapor stream contacted with a fuel oil or any other liquid capable of selectively absorbing the hydrocarbon. The noncondensible gases are recycled or rejected, and the fluid is heated to vaporize and release the fluorochlorocarbon or 1,2-difluoroethane. The latter is compressed and condensed, the absorption fluid is cooled to restore its absorption capabilities, and the sensible heat is recovered.

Advantages of these novel techniques for recovering the parting, carrier liquids are that they are economical and efficient. Also, the equipment in which the recovery is effected can be readily integrated with the apparatus in which the other of the process steps described herein are carried out.

Vacuum and air purges are, as such, known as is the use of an "oil" to separate on gas from another by selective absorption as shown by the following U.S. Pat. Nos. 2,429,751 issued Oct. 28, 1947, to Gohr et al; 3,392,455 issued July 16, 1968, to Kingsbaker et al; 3,439,432 issued Apr. 22, 1969, to Bellinger et al; 2,497,421 issued Feb. 14, 1950, to Shiras; 2,614,658 issued Oct. 21, 1952, to Maher et al; 2,652,129 issued Sept. 15, 1953, to Benedict; 2,710,663 issued June 14, 1955, to Wilson; 2,870,868 issued Jan. 27, 1959, to Eastman et al; 2,961,065 issued Nov. 22, 1960, to Helm et al; and 3,208,199 issued Sept. 28, 1965, to Pruiss.

However, none of these patents disclose a method for recovering fluorochlorocarbons or 1,2-difluoroethane or techniques which, even if they could somehow be adapted to this use, would have the advantages ours given. The same is true of the heretofore proposed techniques for recovering organic fluorine compounds described in the following U.S. Pat. Nos. 2,508,221 issued May 16, 1950, to Calfee et al; 3,013,631 issued Dec. 19, 1961, to Johnson; 3,197,941 issued Aug. 3, 1965, to Colton et al; 3,236,030 issued Feb. 22, 1966, to Von Tress; 3,581,466 issued June 1, 1971, to Rudolph et al; 3,617,209 issued Nov. 2, 1971, to Massonne et al; and 3,680,289 issued Aug. 1, 1972, to Rudolph et al.

Yet another suggestion that halogenated hydrocarbons such as acetylene bromide can be recovered by selective absorption is found in an unpublished article by Tveter and O'Connell entitled Heavy Liquids for Mineral Beneficiation. However, our technique for recovering fluorochlorocarbon and 1,2-difluoroethane parting liquids differs in an advantageous manner in that we are able to recover from the absorbing medium significant amount of the sensible heat added to the medium to release the parting liquid from it.

The novel recovery techniques described above are of course of general applicability. That is, they can be used to recover fluorochlorocarbons and 1,2-difluoroethane from other solids besides coal, rejects from a coal cleaning operation, and ash generated by burning coal.

From the foregoing it will be apparent to the reader that one important and primary object of our invention resides in the provision of novel improved methods for beneficiating coal to separate the coal from foreign material associated therewith.

Related and also important but more specific objects of the invention reside in the provision of methods for beneficiating coal:

(1) which are efficient and economical;

(2) which employ parting liquids that can be essentially completely recovered at a modest cost;

(3) which employ parting liquids with specific gravities in a range that make the liquids capable of effecting a sharp separation between the coal and associated foreign matter;

(4) which employ parting liquids that are available in large quantities at modest cost;

(5) which employ non-corrosive, non-toxic, and non-flammable parting liquids that are chemically inert with respect to coal under the process conditions we employ;

(6) which can be carried out at ambient pressure and temperature or under conditions which vary only modestly from ambient;

(7) which employ parting liquids that will not leave corrosive or other unwanted residues on the product coal;

(8) which are efficient even when the moisture content of the coal to be processed is high;

(9) which are capable of efficiently recovering coal from slurry ponds, gob piles, and the like at modest cost;

(10) in which the separation of the coal from the foreign material proceeds rapidly;

(11) which are highly effective in separating sulfur from coal;

(12) which, in conjunction with the preceding object, are capable of separating organic as well as pyritic and sulfate sulfur;

(13) which do not have the slime and flocculation problems common to many gravity separation processes;

(140) in which the specific gravity of the parting liquid can be readily adjusted and, equally easily, be kept constant or varied in a controlled manner under changing pressure and temperature conditions;

(15) which are effective to separate coal of large size consists and of very small particle size;

(16) which do not generate ecologically undesirable wastes.

Another important and primary object of our invention resides in the provision of novel, improved methods for transporting coal and other solids from place-to-place.

Related and important but more specific objects of the invention reside in the provision of solids transporting techniques:

(17) which are efficient and economical and in which the solids are transported in slurry form;

(18) which, in conjunction with the preceding object, permit substantially all of the carrier liquid to be recovered from the solids at the terminus with only modest expenditures of energy;

(19) in which, in conjunction with the preceding object, a non-corrosive, non-toxic, and non-flammable fluorochloro derivative of a lower alkyl which has a low viscosity, which is easily recovered, and which is chemically inert relative to the solids under process conditions or 1,2-difluoroethane is employed as the carrier liquid;

(20) which have the advantage that the carrier liquids do not cause flocculation problems;

(21) which employ a carrier liquid that permits the solids-to-liquid ratio of the slurry to be increased above conventional levels without an increase in the power required to move the slurry;

(22) which minimize the tendency of the particles to pack and therefore permit flow to be initiated virtually at once even after the slurry has been static for an extended period of time.

Still another primary object of the present invention resides in the provision of novel, improved techniques for associating additives with coal and other solids to modify the characteristics of the solid material;

Related and more specific but also important objects reside in the provision of techniques:

(23) which can be used to distribute any of a variety of additives uniformly and economically;

(24) which can be employed to advantage to dedust and waterproof coal;

(25) which can be employed to intimately distribute compositions such as quicklime among coal and thereby reduce the sulfur pollutants generated when the coal is burned;

(26) which are capable of introducing additives into even fine pores and micro cracks in the solids being treated;

(27) in which the additive is associated with the solids by dispersing it in 1,2-difluoroethane or a liquid, fluorochloro derivative of methane or ethane; spraying the resulting composition on the solids or submerging the solids in or drenching them with the composition; and removing the liquid carrier;

(28) in which, in conjunction with the preceding object, the carrier liquid is one which is non-corrosive, nonflammable, non-toxic, chemically inert with respect to the additive and the solids, and readily recovered from the solids;

(29) which can be carried out under ambient or other mild conditions and without expensive and exotic process equipment;

(30) which may employ as carrier liquids those used in accord with the principles of the present invention in the beneficiation and transportation of coal, thereby simplifying and reducing the cost of multi-step processing of coal;

(31) which avoid the introduction of water into the product, thereby avoiding the deleterious effects which water can have.

(32) which can be employed to associate a binder with coal so that the coal can subsequently and economically be agglomerated into structurally stable briquettes and the like.

An associated, primary object of our invention resides in the provision of novel, improved methods for economically making briquettes from particulate coal in which a binder is associated with the coal by dispersing it thereon in a 1,2-difluoroethane or liquid fluorochlorocarbon carrier and in which the carrier is then removed and the particles compacted into the desired shape.

A further important and primary object of our invention resides in the provision of novel, improved, integrated methods for processing raw coal and for conveying it from a mine face to a location where the product coal is to be burned, processed, shipped, or otherwise used.

Related and more specific but nevertheless important objects of the invention residue in the provision of such coal handling and processing techniques:

(33) which optimize the recovery of raw coal and its conversion into a product of maximum usefulness as well as the movement of the raw coal to a point-of-use or other terminus;

(34) which are capable of producing higher yields that can be gained by present commercial techniques;

(35) in which the handling and processing steps are so related as to maximize the efficiency of the process;

(36) which reduce the manpower required to mine and process coal and the attendant problems and expense;

(37) which, to a substantial extent, insulate the mining, processing, and transportation of coal from the effects of inclement weather and adverse climates;

(38) which reduce the handling of foreign material associated with the coal;

(39) in which the coal can be protected against oxidation until it reaches the point of consumption;

(40) which can also be employed to efficiently dispose of the refuse generated in the consumption of the coal;

(41) which promote safety and productivity and extend the useful service life of equipment;

(42) which can be utilized to reduce the sulfur generated in the combustion of coal;

(43) which can be used to generate refuse piles with less potential for econological damage than is currently the case;

(44) which employ conveyor apparatus that is less bulky and more easily relocated than that of conventional character.

Yet another primary object of our invention resides in the provision of novel, improved techniques for recovering the fluorochlorocarbons and 1,2-difluoroethane employed in our novel cleaning, transporting, additive incorporating, and briquetting processes and in our novel, integrated process for handling and processing coal from the mine face to the point-of-use or other terminus.

Important, related, and more specific objects of the invention reside in the provision of processes in accord with the preceding object:

(45) by which essentially quantitative amounts of the fluorochlorocarbons and 1,2-difluoroethane can be recovered at an economic cost;

(46) which can readily be integrated with the process in which the 1,2-difluoroethane or fluorochlorocarbon is employed.

Still another important and primary object of the invention resides in the provision of novel, improved apparatuses in and by which the various processes discussed above can be carried out.

Other important objects and features and additional advantages of our invention will be apparent to those knowledgeable in the relevant arts from the foregoing and from the appended claims and working examples and from the detailed description and discussion which follows taken in conjunction with the accompanying drawing, in which:

Figure 10:
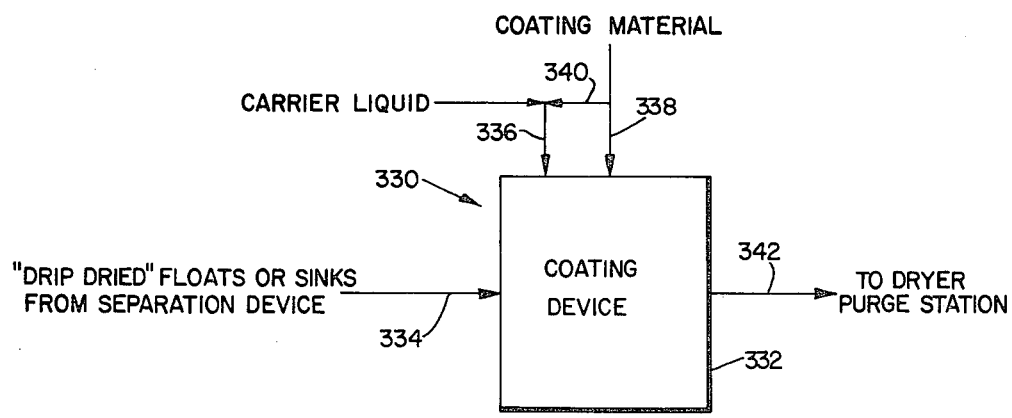
Figure 9:
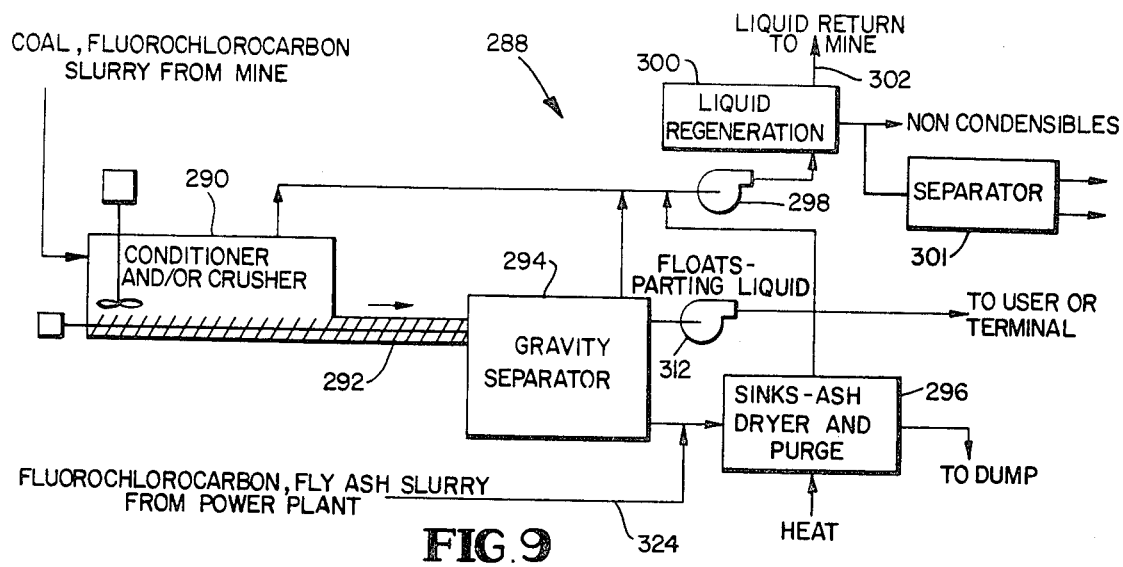
Figure 6:
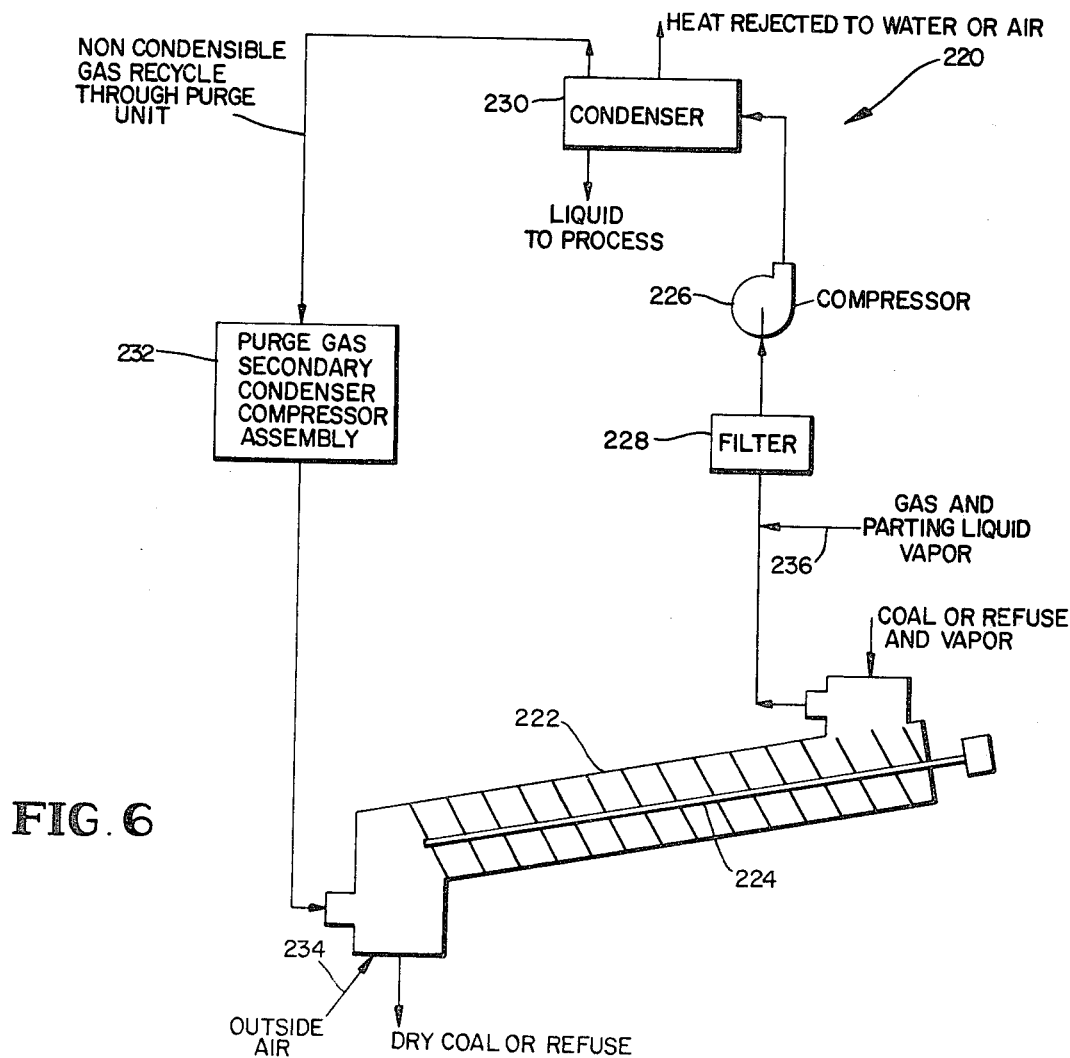
Figure 7:
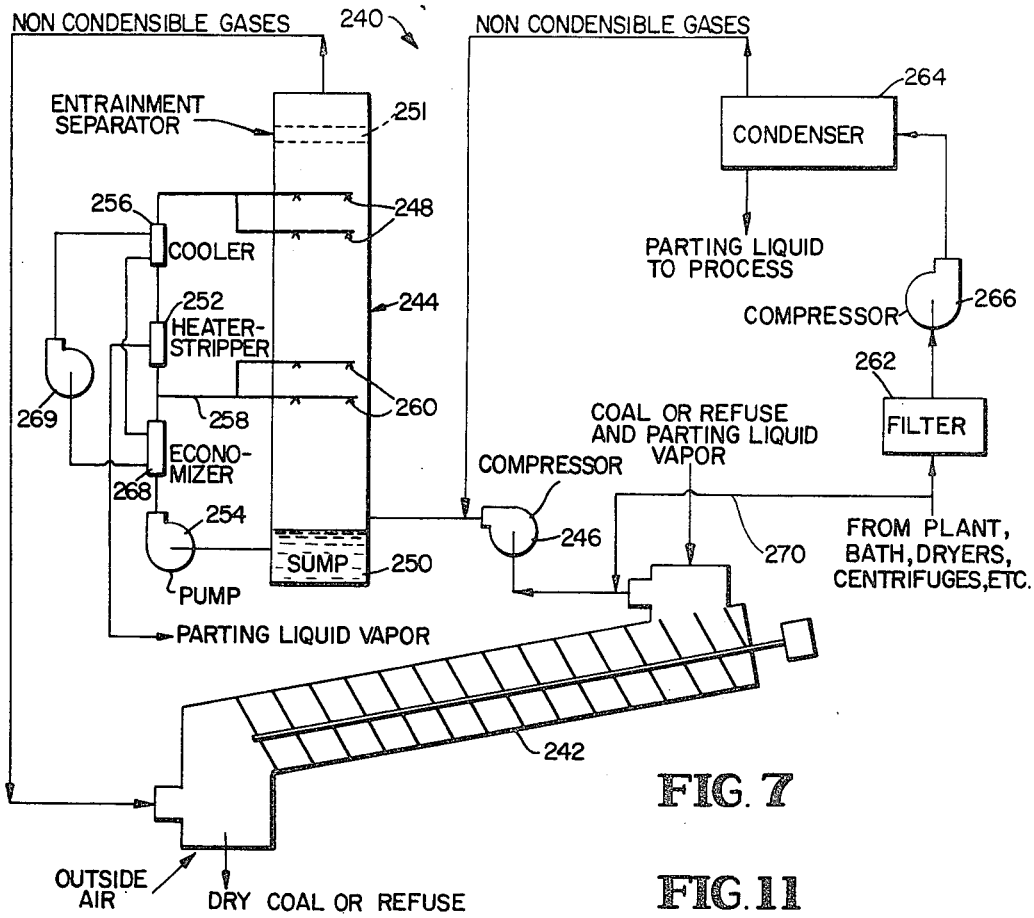
Figure 11:
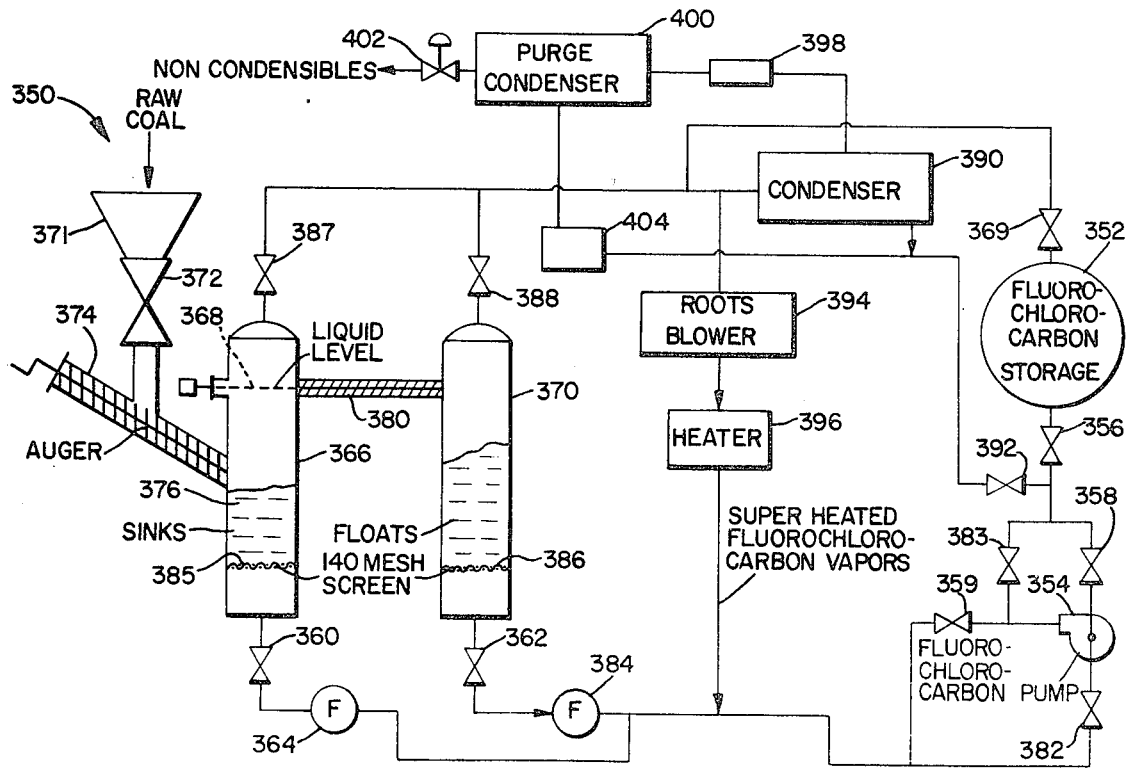
Figure 8:
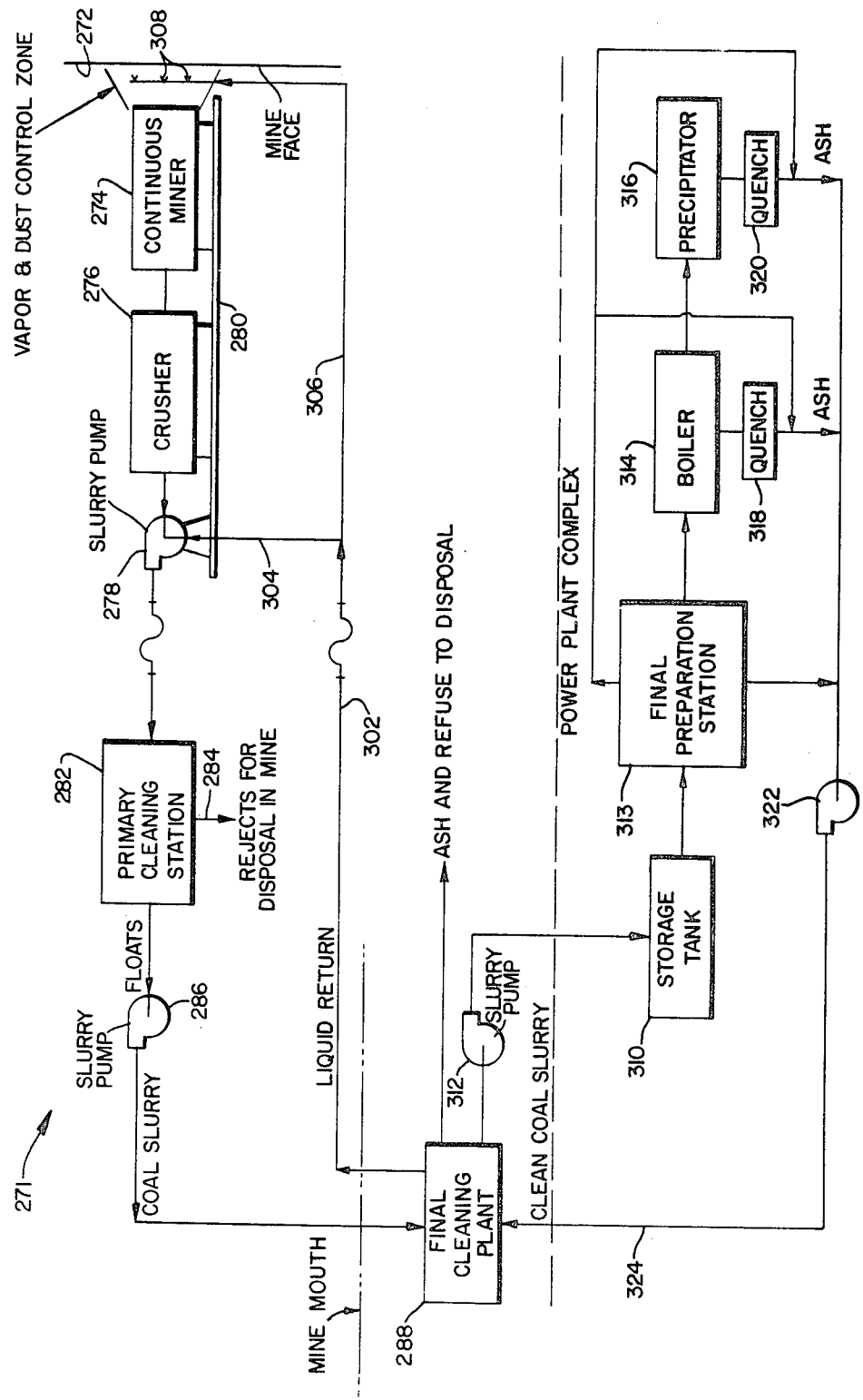

FIGS. 6 and 7 are schematic illustrations of alternate systems for recovering 1,2-difluoroethane and fluorochlorocarbons; these systems can be used to recover 1,2-difluoroethane and fluorochlorocarbons used as parting liquids in beneficiation processes, as carrier liquids, etc. in other applications of our invention, and for various purposes in other processes;

FIG. 8 is a schematic illustration of an integrated system in accord with the principles of the present invention for handling and processing raw coal;

FIG. 9 is a schematic illustration of a final cleaning plant employed in the integrated system of FIG. 8;

FIG. 10 is a schematic illustration of apparatus for associating additives with coal in accord with the principles of the present invention; and FIG. 11 is a schematic illustration of a pilot scale plant for beneficiating coal in accord with the principles of the present invention.

Figure 1:
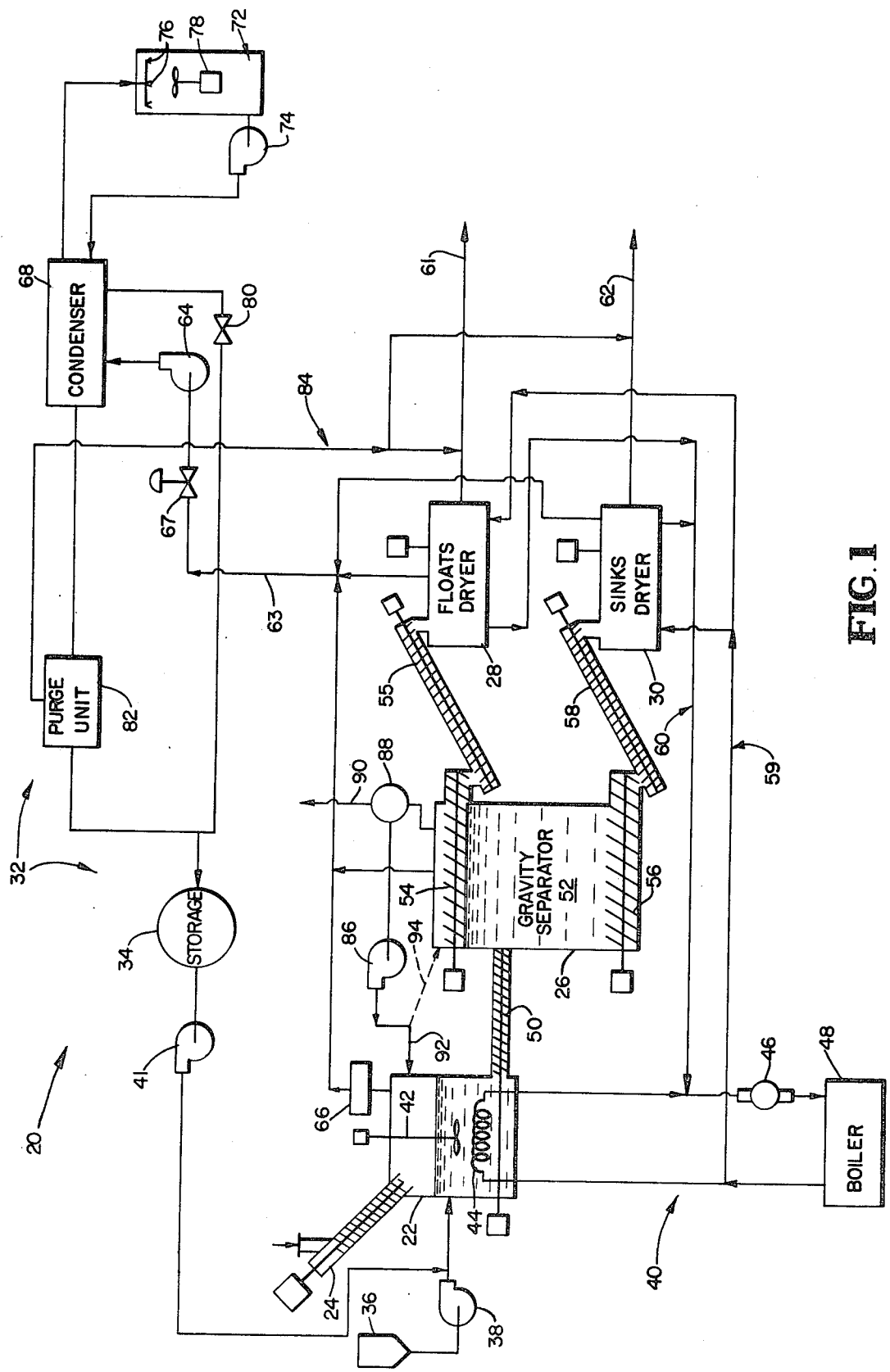
FIG. 1 is a schematic illustration of apparatus for beneficiating or cleaning coal in accord with the principles of the present invention and for recovering from the coal and the foreign material separated therefrom 1,2-difluoroethane or a fluorochlorocarbon employed as a parting liquid in the beneficiation process.

Referring now to the drawings, FIG. 1 schematically depicts a plant or system 20 for cleaning coal which is constructed in accord with the principles of the present invention. The major components of system 20 include a conditioning tank or conditioner 22 which can be omitted in those applications where conditioning is not required. The run-of-mine or other raw coal to be cleaned is transferred from a storage facility to the conditioning tank as by screw conveyor 24. The plant also includes: a separator 26 of bath, drum, trough, cyclone or other construction in which gangue or ash is separated from the coal by a gravity or centrifugal separation (or sink-float) process; dryers 28 and 30 for recovering the parting liquid from the clean coal (or floats) and the rejects (or sinks); and a system identified generally by reference character 32 for recovering parting liquid in vapor form from conditioning tank 22, separator 26, and dryers 28 and 30; condensing the vapor to a liquid; and returning the liquid to storage tank 34. Also incorporated in the system are a storage facility 36 from which a surface active agent can be introduced into the media supply line to tank 22 by pump 38 and a heating system 40 for adjusting the effective temperature of the coal in the conditioning tank before it is transferred to separator 26.

The conveyor 24 for feeding the raw coal into the conditioning unit can be of the screw or auger type. As shown in FIG. 1, it will typically be positioned with a gap between the discharge end and the surface of the liquid in the conditioner. This keeps vaporized liquid in the conditioner, necessarily under some pressure, from blowing out through the conveyor when warm coal is introduced into the conditioner.

Trichlorofluoromethane or another of the fluorochlorocarbon parting liquids we can use or 1,2-difluoroethane is pumped at a controlled rate by pump 41 to the discharge side of pump 38 where it is premixed with the surface active agent (if employed) to insure subsequent homogeneous distribution of the latter.

The parting liquid or mixture of this constituent and surface active agent then flows to conditioning tank 22 where the liquid phase and coal introduced by conveyor 24 are blended into a uniform mixture by agitator 42. The latter also generates the turbulence necessary to insure sufficient surface and thermal exposure of the raw coal to the conditioning material or materials.

At the same time, heating system 40 may be utilized to add to the mixture such heat as may be necessary to control the temperature, and therefore the specific gravity, of the parting liquid in separator 26. Heating system 40 includes a tube type or other circulating liquid heat exchanger 44 in the bottom of conditioning tank 22 and a pump 46 for circulating steam or hot water from a boiler 48 to and through heat exchanger 44 and back to the boiler.

Only modest quantities of heat will, at most, need to be added to the coal being cleaned. This is because it is not necessary to heat larger particles or lumps of coal throughout. It is only required that their surface temperature be approximately that of the parting liquid in separator 26 during the short period of time the coal remains in the separator.

It is also significant that "hot" coal, for example that in the summertime, can be cooled in tank 22 without using additional energy to keep the temperature of the bath in separator 26 from rising if trichlorofluoromethane or a comparable fluorochlorocarbon is employed as the parting liquid. Because this compound has a boiling point only slightly above room temperature, such coal will cause the parting liquid introduced into tank 22 by pump 41 to evaporate. The latent heat of vaporization is supplied by the coal, and the temperature of the coal and other components of the mixture in tank 22 is accordingly reduced as the parting liquid vaporizes.

The mixture formed in conditioning tank 22 is transferred to separator 26 as by a screw type conveyor 50. The coal in the mixture floats to the top of the body or bath 52 of parting liquid in the separator while the ash or rejects sink to the bottom.

The coal is skimmed from the surface of sink-float bath 52 as by an auger conveyor 54, preferably equipped with folding flights. This skimmer discharges the coal into the lower, feed end of an upwardly inclined conveyor 55. The conveyor transfers the coal to floats dryer 28. As the coal moves upwardly through transfer conveyor 55, the bulk of the parting liquid drains from it and flows by gravity back into separator 26.

Rejects are removed from the bottom of separator 26 as by a folding flight, auger conveyor 56 and discharged into the lower, feed end of a second, upwardly inclined, transfer conveyor 58 in which the parting liquid drains from the rejects into separator 26. From conveyor 58, the rejects are discharged into sinks dryer 30.

Dryers 28 and 30 will typically be of the indirect, conductive type. Examples of such dryers which are suitable are the rotary, steam tube, and Hollow Flite types. Steam or hot water is supplied to the dryers to vaporize the parting liquid associated with the floats and sinks from boiler 48 by pump 46 through supply conduit system 59. After circulating through the dryers, the heat exchange medium returns to the boiler through fluid conduit system 60.

For the sake of clarity, sinks dryer 30 is shown at a lower elevation than floats dryer 28 in FIG. 1. In actual practice it is located at approximately the same level as dryer 28 so liquid can drain back into separator 26 which it could not do if the dryer were located at the illustrated level.

The dry coal and dry rejects are discharged from dryers 28 and 30 to material handling systems indicated generally by arrows 61 and 62 in FIG. 1. The rejects are transferred to a gob pile and the clean coal to the point-of-use or to a coking or other coal treating operation.

Vaporized parting liquid generated in dryers 28 and 30 is combined with that from conditioning tank 22 and separator 26 in a line 63 leading to the inlet side of a compressor 64. As the vapor from conditioning tank 22 may carry a significant amount of entrained fines, this vapor is first preferably scrubbed with parting liquid in a conventional scrubber 66.

After flowing from the compressor through a valve 67 employed to maintain pressure in the system, the vaporized parting liquid is circulated through a condenser 68 which may be of the conventional shell and tube type. Cooling liquid (typically water) at a temperature on the order of 85° F. is circulated from the lower end of a conventional cooling tower 72 through the condenser by pump 74 to condense the parting liquid.

After exiting from the condenser, the water, now at a temperature on the order of 95° F., returns to and is sprayed into the upper end of the cooling tower through nozzles 76. As the water flows down through the cooling tower, it is contacted by an upwardly moving stream of air generated by cooling tower fan 78. This reduces its temperature to the level at which it is circulated to condenser 68.

Condensed parting liquid flows through an expansion valve or orifice 80 to reduce its pressure to atmospheric and then to the parting liquid storage facility or tank 34.

Noncondensible gases and any parting liquid which may not have condensed proceed from condenser 68 to a purge unit 82. This may be a scrubber or other absorption type device or a mechanically refrigerated unit, for example. The remaining parting liquid is condensed in this unit and returned to storage tank 34.

Noncondensible gases flow through a conduit system identified generally by reference character 84 to the floats and sinks dryers 28 and 30. The gases are circulated through these dryers in countercurrent relationship to the solid material to strip parting liquid vapors from the solid material.

In cleaning some coals, significant amounts of middlings may be generated. To expedite the separation of this material, pump 86 can be employed. This pump circulates the middlings and parting liquid in which they are entrained from a zone in bath 52 intermediate those to which the floats and sinks report to a cyclone, centrifuge, or other polishing device 88. Here, the solids are separated from the parting liquid and discharged from the separator as indicated by arrow 90. Depending upon the proximate analysis of these solids, they are conveyed to either the floats dryer 28 for clean coal or the sinks dryer 30 for rejects. The parting liquid is pumped to either conditioning tank 22 as shown by solid line 92 or to gravity separation tank 26 as shown by dotted arrow 94.

As will be apparent to the reader, variations can be made in the illustrated equipment. Obvious changes are necessary if the conditioning tank 22 is not employed. Other types of conveyors may be used. The conditioner tank and agitator may be replaced with a pug mill, jacketed screw conveyor, or other blender, etc. Centrifuges can be employed instead of or in addition to drip drying as in conveyors 55 and 58 to remove parting liquid (ca. 97 percent) from the solids as can static and vibrating screens, etc. And shelf-type and other kinds of dryers can be used instead of those discussed above. Still other alternatives will readily suggest themselves to those skilled in the relevant arts.

In addition to those discussed above, a system as just described has the advantage that losses of the parting liquid constituents are acceptable. In a typical operation, losses would not exceed 0.25 pounds of liquid per ton of coal cleaned.

As indicated above and discussed in more detail hereinafter, it may in some instances be advantageous to adjust the specific gravity of the parting liquid to increase the amount of ash separated from the coal even though this may result in some coal reporting to the sinks and thereby lowering the yield.

Figure 2:
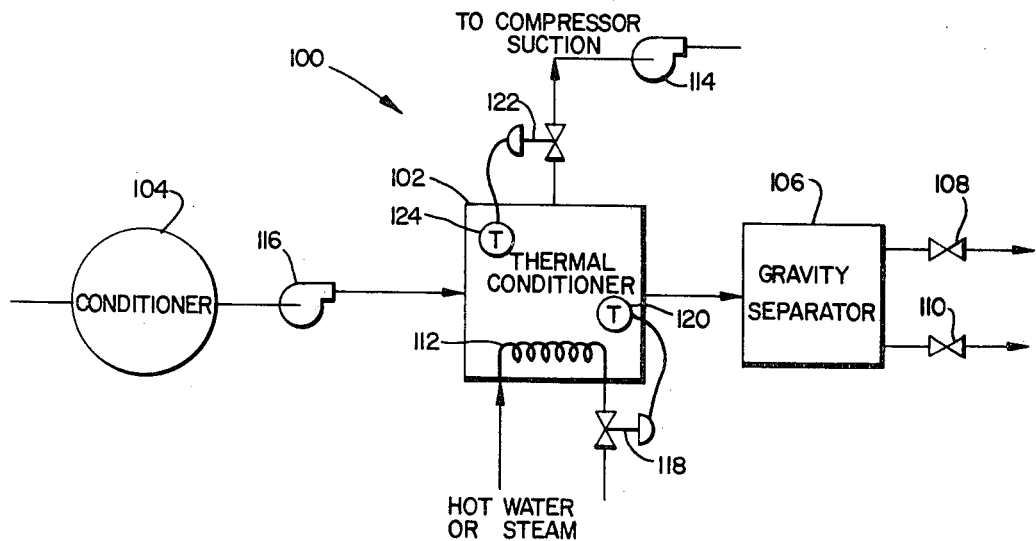
FIG. 2 is a schematic illustration of one type of apparatus for controlling and adjusting the specific gravity of the parting liquid employed in the beneficiation apparatus of FIG. 1.

The manner in which this is done in the case of the preferred parting liquid, trichlorofluoromethane, is exemplary. Trichlorofluoromethane has a nominal specific gravity of 1.5 which can readily be varied over a range of approximately 1.4–1.55 by increasing the temperature under an above-atmospheric pressure to reduce the specific gravity or decreasing the temperature to increase the specific gravity. One typical system for adjusting the specific gravity of the parting liquid by these techniques is shown in FIG. 2 and identified by reference character 100.

This system differs from that shown in FIG. 1 in that a thermal conditioner or holding tank 102 is interposed between conditioner 104 and separator 106, which can be isolated from the floats and sinks dryers (not shown) by valves 108 and 110.

A coil 112 through which a heat transfer fluid such as hot water, steam, etc. can be circulated is housed in thermal conditioner tank 102. The conditioner tank is connected to the suction side of a compressor 114.

In operation, the slurry of coal and parting liquid formed in conditioner 104 is transferred to thermal conditioner 102 by pump 116. Here, the specific gravity of the parting liquid can be raised by employing compressor 114 to flash liquid in the conditioner into vapor, extracting heat from and increasing the specific gravity of the remaining liquid. Alternatively, the specific gravity of the parting liquid can be lowered by adding heat to the liquid with heater 112. This can typically be accomplished in not more than 10 minutes.

The practical limits within which the specific gravity of the parting liquid can be decreased and increased will vary depending upon the parting liquid. The limits will be comparable to those mentioned above for trichlorofluoromethane.

The flow of heat transfer fluid and therefore the amount of heat added to the coal and parting liquid can be controlled manually. Or, as shown, the flow can be regulated by a conventional thermostatic valve 118 having a sensor 120 in the thermal conditioning tank.

Similarly, evacuation of parting liquid vapor from thermal conditioner 102 to decrease the specific gravity of the parting liquid can also be controlled manually or automatically. In the latter mode control is exercised by a valve 122 with a temperature responsive sensor 124 in the thermal conditioner tank.

If reduced pressure is employed to alter the specific gravity of the parting liquid, valves 108 and 110 will be kept closed until the separation step is completed. This, together with the seal afforded by pump 116, isolates the thermal conditioner and gravity separator from the ambient atmosphere, insuring that the pressure on the parting liquid and its specific gravity remain constant.

Figure 3:
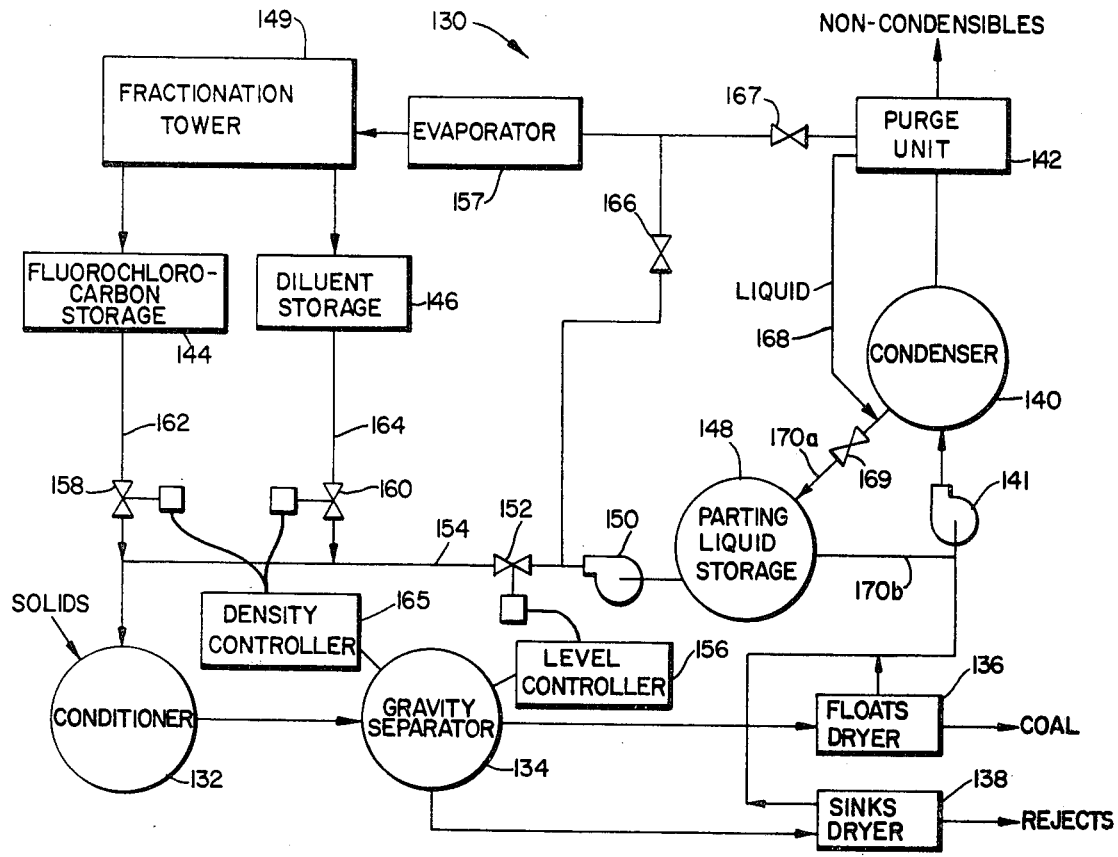
FIG. 3 is a schematic illustration of a second form of apparatus for controlling and adjusting the specific gravity of the parting liquid.

We pointed out above that larger changes in the specific gravity of the parting liquid can readily be made by diluting the fluorochlorocarbon or 1,2-difluoroethane with a light petroleum fraction or a liquid hydrocarbon. A coal cleaning system in which the specific gravity of the parting liquid can be altered in this fashion is illustrated in FIG. 3 and identified by reference character 130.

System 130 is comparable to system 20 in that it includes a conditioner tank 132; a separator 134; floats and sinks dryers 136 and 138; a condenser 140 to which recovered vapors are pumped by compressor 141; a purge unit 142 for recovering parting liquid from the dryers, purging it of noncondensibles, and condensing it; and a fluorochlorocarbon storage tank 144 which may be used to contain 1,2-difluoroethane. System 130 also includes a storage tank 146 for the liquid diluent employed to lower the specific gravity of the fluorochlorocarbon or 1,2-difluoroethane and a storage tank 148 for the parting liquid—typically a mixture of trichlorofluoromethane and petroleum ether.

The operation of this system is generally the same as that shown in FIG. 1. The recovered, condensed parting liquid, however, can be returned from condenser 140 to the parting liquid storage tank 148 and/or stripped of noncondensibles in purge unit 142 and circulated to a conventional fractionation tower 149.

Parting liquid is transferred from tank 148 to conditioning tank 132 by pump 150 as necessary to maintain the level of parting liquid in gravity separation tank 134 constant. This level can be automatically maintained by a modulating valve 152 in the parting liquid supply line 154. The operation of this valve is regulated by a conventional level controller 156 having a sensor (not shown) in tank 134.

The parting liquid returned to fractionation tower 149 is first passed through an evaporator 157 to insure that it is in the gas phase. The gases are then separated in the fractionation tower into 1,2-difluoroethane or fluorochlorocarbon and diluent constituents which, after condensing, return to tanks 144 and 146, respectively. Liquids are fed from these tanks into parting liquid supply line 154 as necessary to keep the density of the parting liquid constant. Control over this operation is afforded by modulating valves 158 and 160 in supply lines 162 and 164. The operation of the valves is regulated by a conventional density controller 165 with a sensor (not shown) in gravity separation tank 134.

If the supply of liquids in tanks 144 and 146 runs low, valve 166 is opened. Liquid is then pumped from tank 148 to evaporator 157 and fractionation tower 149 to replenish the supply. Conversely, if the levels in the fluorochlorocarbon and diluent tanks becomes too high, valve 167 can be closed and the 1,2-difluoroethane or fluorochlorocarbon, diluent mixture returned directly to storage facility 148 from purge unit 142 through line 168.

A third valve, 169, reduces the pressure on the liquid returned to storage tank 148 through line 170a from that in the condenser (the discharge pressure of compressor 141) to that in the storage tank. Line 170b is used to return vapors generated by the expansion of liquid in valve 169 to the inlet side of compressor 141.

A typical parting liquid specific gravity that the system just described might be employed to maintain is 1.3. This can be generated at ambient temperature and pressure by mixing 22.2 weight percent petroleum ether with 77.8 percent trichlorofluoromethane.

As the seasons change, the temperature of the incoming coal may vary. The variations in the specific gravity of the parting liquid which this will tend to cause are automatically compensated for in the system shown in FIG. 3. Density controller 165 will vary the proportions of trichlorofluoromethane and diluent to offset any tendency of specific gravity to vary.

Figure 4:
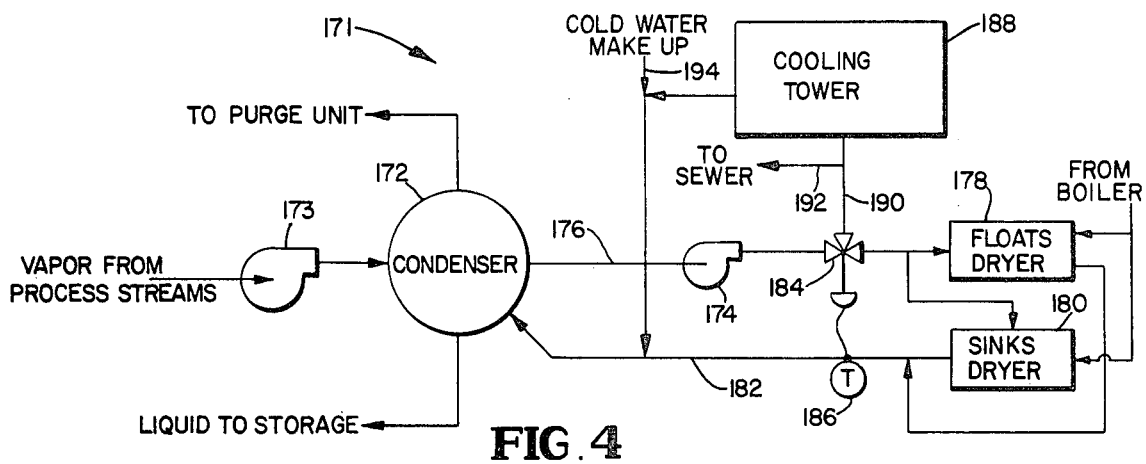
FIG. 4 is a view similar to FIG. 1 of coal beneficiation apparatus in accord with the principles of our invention which is designed for the conservation of heat energy.

As discussed above, coal cleaning plants in accord with the principles of the present invention may also be constructed in a manner which will permit significant amounts of heat generated in the course of cleaning the coal to be recovered. One arrangement for accomplishing this goal is shown in FIG. 4 and identified by reference character 171. In this system, vaporized parting liquid is pumped to a condenser 172 as described above by compressor 173. Here, it gives up heat to a cooling liquid circulated through the condenser, increasing the temperature of the latter and condensing the parting liquid.

The heated cooling water is discharged from condenser 172 at a temperature typically in the range of 95° to 120° F., which is well above the vaporization temperature of our preferred trichlorofluoromethane. The heated water is circulated by pump 174 through conduit system 176 to floats and sinks dryers 178 and 180 and then through conduit system 182 back to the condenser, thereby supplying heat required to operate the dryers. This further reduces the already modest cost of cleaning coal in accord with the principles of the present invention.

In some applications, the water discharged from condenser 172 may contain more heat than is needed for the operation of dryers 178 and 180. A three-way modulating valve 184 controlled by a thermostat 186 is therefore preferably interposed between pump 174 and dryers 178 and 180. This valve automatically diverts water as necessary to cooling tower 188 where its temperature is reduced. The cool water is piped through conduit 190 and mixed with the water recirculated to condenser 172 from the dryers.

Alternatively, or in addition, the excess hot water can simply be discharged from the system into a sewer, etc. as shown by line 192 and replaced by cooler makeup water as shown by arrow 194.

Figure 5:
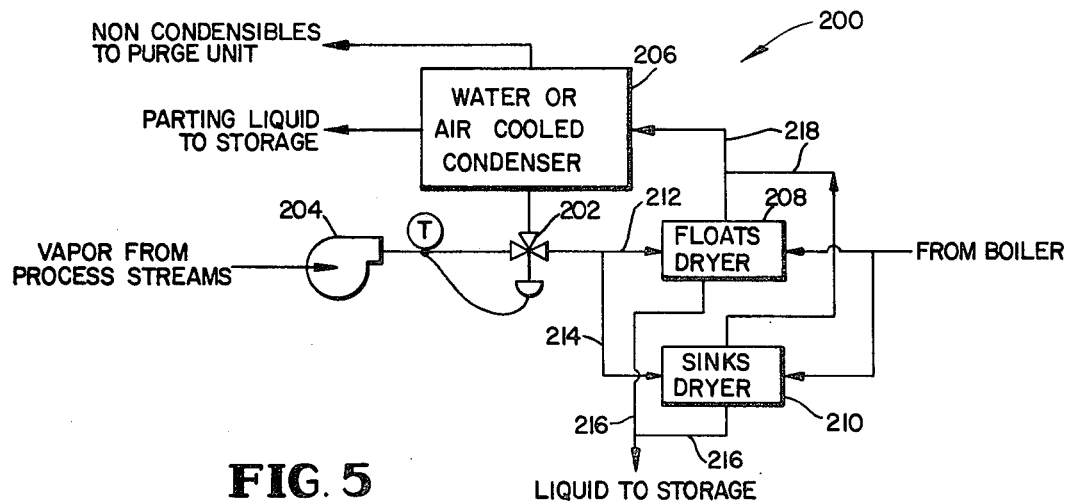
FIG. 5 is a view similar to FIG. 4 of a second form of coal beneficiation apparatus designed for the conservation of heat energy.

FIG. 5 illustrates a heat conservation arrangement 200 which differs from system 171 in that the vaporized parting liquid recovered from the floats and sinks dryers, gravity separation tank, and conditioning tank (the conditioning tank and separator are not shown) is employed to operate the dryers.

In system 200, a thermostatically controlled, three-way valve 202 is interposed between compressor 204 and condenser 206. Vapor recovered from the system components mentioned in the preceding paragraph flows from this valve to floats and sinks dryers 208 and 210 through conduits 212 and 214 to operate the dryers. Vapor in excess of that required to operate the dryers is automatically diverted to condenser 206 where it is processed as described above.

Parting liquid condensed in the dryers returns to the storage facility through conduits identified generally by reference character 216. Noncondensibles and vapor flow through conduits identified collectively by reference character 218 to condenser 206 where the parting liquid is condensed and returned to storage. Noncondensibles and any remaining uncondensed parting liquid flow to a purge unit (not shown) such as that identified by reference character 82 in FIG. 1. Here, additional parting liquid is recovered and returned to storage. Noncondensibles are recirculated to the dryers 208 and 210 as a stripping gas or rejected from the system.

The system just described has the virtue of reducing the capacity of condenser 206 with a concomitant decrease in capital investment and in the cost of operating the coal cleaning plant.

As shown in the drawing, plants 171 and 200 are both preferably equipped with a second, independent heat source such as the boiler 48 and circulation system 59, 60 illustrated in FIG. 1. This system is used during start-up of the plant when required and, if necessary, to augment the heat supplied to the floats and sinks dryers 178 and 180 or 208 and 210 by the heated fluid in plant 171 or the vaporized parting liquid in plant 200.

One system for drying the coal and the rejects and recovering the vaporized parting liquid associated with the solids is illustrated in FIG. 1 and was described above. A second system for accomplishing these objectives is illustrated in FIG. 6 and identified by reference character 200.

In this system the drip dried but vapor saturated coal or refuse is fed into one end of a purge tube or vessel 222 through which it is conveyed as with auger type conveyor 224. As the material moves through purge tube 222, the vaporized parting liquid is stripped from it by gases introduced at the discharge end of the purge tube. These gases are circulated through the purge tube in countercurrent relationship to the movement of the solids by compressor 226 and exit from the feed end of the purge tube.

Entrained solids are removed from the vapor laden gases exiting from the purge tube by a filter 228. The pressure on the mixture is then increased by compressor 226 to a level at which the parting liquid can be economically condensed; and the mixture is circulated to condenser 230, which may be of the character described above. The parting liquid vapor is condensed and the liquid returned to storage.

Heat rejected from the condenser may be recovered as discussed above in conjunction with the systems 171 and 200 shown in FIGS. 4 and 5.

The noncondensible gases rejected from the condenser are recirculated to purge tube 222 for use as a stripping gas. As shown in FIG. 6, they may first, however, be compressed to a higher pressure and circulated through a second condenser to recover additional parting liquid (the secondary compressor and condenser are identified collectively by reference character 232).

In addition, or optionally, outside air can be introduced into the discharge end of purge tube 222 to strip vapors from the solids therein as indicated by arrows 234.

Other vapor recovered from the coal cleaning plant can also be stripped of noncondensibles recovered in system 220. The gases are introduced into the parting liquid recovery system at the location indicated by arrow 236.

The components of a parting liquid recovery system of the character just described do not necessarily have to be as shown in FIG. 6. For example, a belt conveyor could be substituted for the illustrated screw conveyor. A vertical purge tube could be employed and the conveyor eliminated, the solids travelling down the purge tube by gravity. Still other modifications will suggest themselves to those conversant with the relevant arts.

In yet another variation of the illustrated system, the gases and vapors are evacuated by drawing a vacuum in the purge tube. The parting liquid is then recovered and the noncondensible gases utilized as discussed above or rejected to the ambient surroundings as they also can be in the illustrated system.

While the system for recovering the parting liquid described in the preceding paragraph is somewhat complicated and cumbersome because of the locks, etc. needed to maintain a subatmospheric pressure in the purge vessel, it is also efficient. For example, a typical coal contains 42.76 percent by volume voids. At 75° F., this coal contains 6.28 pounds of trichlorofluoromethane per ton. By reducing the pressure on the dried coal to 29 inches of Hg below atmospheric and recovering the gases generated in doing so, all but 0.24 pounds per ton of the parting liquid can be recovered.

We have also discovered that the natural affinity which 1,2-difluoroethane and the fluorochlorocarbons we employ possess for oils can be taken advantage of in recovering vaporized parting liquid. The vapor is contacted with oil, which absorbs the vaporized parting liquid but not the noncondensibles, which can be used as a stripping gas or rejected. The oil is then heated to release the parting liquid which is condensed and recycled. This approach is both more effective and more economical than the previously described mechanical compression and condensation when the ratio of noncondensible gases to parting liquid vapor is high.

An exemplary system for recovering parting liquid by the technique just discussed is illustrated in FIG. 7 and identified by reference character 240.

In this system, the vaporized parting liquid is stripped from the coal or refuse in purge tube 242, compressed, and pumped into the lower end of vertical tower 244 by compressor 246. Numeral 2 fuel oil or other absorbent liquid is sprayed into the upper end of tower 244 through nozzles 248 and travels downwardly through the tower in countercurrent relationship to the upwardly flowing gases. The absorption medium scrubs or strips the parting liquid vapors from the noncondensible gases, the vapor rich oil collecting in a sump 250 at the bottom of tower 244. Noncondensible gases pass through a separator 251, which removes entrained liquid and vapors; exit from the upper end of the tower; and recirculate to purge tube 242.

The parting liquid is recovered by pumping the 1,2-difluoroethane or fluorochlorocarbon rich oil from sump 250 through a heater or heat exchanger 252 with pump 254. The parting liquid vapor released from the oil in heater 252 is condensed as described previously (the condenser is not shown) and recirculated to the coal cleaning process or returned to storage.

The stripped absorption medium is cooled in a heat exchanger 256 to increase its absorption capacity and recirculated through tower 244.

The heaters or heat exchangers 252 and 256 may be of the shell and tube type although it is not essential that this particular kind of device be used.

As shown in FIG. 7, oil pumped from sump 250 may be diverted into line 258 and sprayed into tower 244 through nozzles 260. This increases the concentration of parting liquid in the oil collecting in sump 250, reducing the thermal loads on heat exchangers 252 and 256.

System 240 is also designed to recover parting liquid vapors from mixtures collected from other components of the coal cleaning plant such as the conditioner, gravity separator, and dryers. Gases and vapors from these components are circulated through a filter 262, compressed, and circulated to a condenser 264 by a compressor 266. The parting liquid is condensed in condenser 264 and recirculated or returned to storage. The noncondensible gases rejected from the condenser are combined with those recovered from purge unit 242 on the discharge side of compressor 246 and thereby recirculated to tower 244 to recover additional parting liquid.

As shown in FIG. 7, an economizer 268 can be interposed between pump 254 and heater 252. Pump 269 circulates water or other heat exchange liquid from cooler 256 through the economizer. Sensible heat extracted from the oil in cooler 256 by the heat exchange liquid is given up to the parting liquid rich oil flowing to heater 252, thereby conserving energy by reducing the load on the heater.

Also, compressor 246 may be eliminated; and the gases from purge tube 242 may be delivered through duct 270 to the inlet of filter 262.

In some applications a combination of the systems 200 and 240 just discussed can be used to optimize the recovery of the parting liquid. Mechanical compression and condensation are employed to recover the parting liquid from the vapor rich gases, and the parting liquid is recovered from the leaner gases by the absorption technique.

It is also to be understood that the purge tubes employed in the systems of FIGS. 6 and 7 can be used as dryers in the systems described above and hereinafter. Or, what is referred to in the description of such systems as a dryer may constitute one or more purge tubes and other drying equipment arranged in the order deemed most suitable for a particular application.

As discussed briefly above, coal cleaning apparatus of the character described in conjunction with FIGS. 1-7 can be integrated into a novel system for handling and processing coal in which the parting liquid is also employed to convey the coal and ash generated in its combustion. One integrated coal handling system of this character is illustrated in FIG. 8 and identified by reference character 271.

In this system, coal is separated from mine face 272 as by a continuous miner or auger 274 such as a Badger Manufacturing Company Coal Badger or a Salem Tool Company MC MUL-T, for example. From the miner the coal and gangue flows to an optional crusher 276, where the mined coal is reduced to a typical top size of in the range of 1.5 inches, and then to a slurry pump 278, where it is mixed with 1,2-difluoroethane or one of the fluorochlorocarbons described above. As shown in FIG. 8, the miner, crusher, and slurry pump can conveniently be mounted on a single chassis 280.

The liquid content of the foregoing and other slurries formed in accord with the principles of the present invention will vary from application-to-application. This phase will, however, constitute from 40 to 99 weight percent based on the total weight of the slurry.

Slurry pump 278 transfers the coal and 1,2-difluoroethane or fluorochlorocarbon mixture to a primary cleaning station 282 of the character described above in conjunction with FIGS. 1-6 and preferably located in the mine. The dried rejects from the cleaning operation, typically first coated with a dust suppressant, are conveyed to and dumped in a mined-out area of the mine as indicated by arrow 284.

The floats generated in the primary cleaning station (coal plus foreign material not removed in the primary cleaning step) and parting liquid from the primary cleaning station form a slurry which is pumped by slurry pump 286 to a final cleaning plant 288 located on the surface.

The initial unit 290 of the final cleaning station, shown in FIG. 9, will typically include a second crusher for reducing the solids in the slurry to the size consist specified by the consumer or to a size which will free additional pyrites and/or other foreign material. Unit 290 will in general also include a conditioning tank such as that shown in FIG. 1 so that additives and parting liquid can be blended with the slurry, the temperature of the coal adjusted, etc.

From this unit, the slurry is transferred as by screw conveyor 292 to a gravity separator 294 also as described above. The sinks from the gravity separator are transferred to a dryer 296 where the 1,2-difluoroethane or fluorochlorocarbon parting and carrier liquid is separated by adding heat to the slurry to evaporate the liquid and by purging the solids to recover the 1,2-difluoroethane or fluorochlorocarbon from the pores of the solids. Also, as discussed above, the sinks may first be drip dried to reduce the energy required to remove the fluorochlorocarbon or 1,2-difluoroethane by evaporation. Suitable equipment for these functions is that discussed above and illustrated in FIGS. 1, 6, and 7, for example.

The dried rejects, first optionally coated to inhibit oxidation and the generation of acidic ground water, are conveyed to a gob pile or other disposal area. The vaporized parting liquid recovered from dryer 296, together with that from unit 290 and gravity separation tank 294, flows to compressor 298. Compressor 298 pumps the vapor to a unit 300 typically consisting of a condenser and purge unit as discussed above.

The noncondensibles are separated from the parting liquid vapor in unit 300. As in the embodiments of the invention discussed above, they can be recirculated and used as a stripping gas in sinks dryer 296. Alternatively, or in addition, they can first be processed through an absorber or other conventional device 301 to separate and recover commercially valuable products such as methane removed from the mine face, etc.

The condensed parting liquid is circulated through conduits identified generally by reference characters 302, 304, and 306 to slurry pump 278 and to mine face 272. The latter liquid alone, or with such additives as may be desired, is sprayed onto the mine face as through nozzles 308. This suppresses dust generated at the mine face, reducing the explosion hazard. The liquid also reduces cutter wear and the power needed to operate continuous miner 274.

In a typical application the clean coal from gravity separator 294 is pumped in slurry with the parting liquid to a storage tank 310 by slurry pump 312. The slurry is typically stored at ambient temperature and pressure.

On demand, the slurry is withdrawn from storage tank 310 and transferred to a final preparation station 313. This station includes a floats dryer and a parting liquid recovery unit as described above for recovering the fluorochlorocarbon or 1,2-difluoroethane carrier liquid used in the transport of the coal and for recirculating the noncondensibles to the dryer and/or recovering certain of the gases. Also, the final preparation unit may include one or more units for further treating the coal. For example, quicklime or calcined dolomite can be blended with the coal at this station to, as discussed above, decrease the sulfur content of the combustion products generated when the coal is burned.

The amount of quicklime or dolomite added to the coal will be course depend upon a number of factors including the sulfur content of the coal, the conditions under which it is burned, etc.

In a typical application 90 pounds per ton of 200 m×0 calcined dolomite is intimately dispersed on Pittsburgh. coal using trichlorofluoromethane as the carrier. The efficiency of the reaction between the calcium and magnesium oxides and the sulfur in the coal during the subsequent burning of the coal is ca. 80 percent. This reduces the sulfur content of the combustion gases from the three percent level of untreated coal to a level of 0.6 percent. The latter level is well within Environmental Protection Agency limits.

The reduction in sulfur content is also well below that which can be achieved by adding the same materials to coal in the conventional manner; viz., dry mixing. This technique is capable of only imperfectly distributing the additive, making the efficiency of the subsequent oxide, sulfur reaction much lower than it is when the additive is distributed by our novel process.

Our novel process for reducing combustion gas sulfur content is also superior to more conventional techniques for accomplishing the same goal such as scrubbing the combustion products. Treating the coal in the exemplary application described above by our process costs ca. $1.13 per ton. To accomplish similar results by scrubbing would cost $3-4 per ton of coal burned.

Referring again to FIG. 8, in the exemplary illustrated system the coal is transferred from final preparation station 313 to a boiler 314 typically equipped with a precipitator 316 to recovery fly ash generated in the combustion of the coal.

The ash generated in boiler 314 and in precipitator 316, respectively, is quenched in units 318 and 320 to reduce its temperature to on the order of 100° F. Liquid recovered in final preparation unit 313 is circulated to the discharge sides of the quench units by pump 322 and mixed with the ash to form a slurry. This slurry is pumped to the sinks (ash) dryer and purge unit 296 of final cleaning plant 288 through a conduit system indicated generally by reference character 324. The ash can accordingly be dried and disposed of with the rejects from the final cleaning process.

One important advantage of the novel system 271 just described is that as much as 10 to 30 percent of the mined solids may not have to be conveyed to the surface, resulting in a significant cost savings. Also, because the rejects from the final cleaning station typically constitute only 12 to 50 percent of the mined material, the aboveground cost of disposing of rejects can also be lowered.

Furthermore, the system is highly versatile. As discussed previously, it can with only readily made modifications be used to furnish the feed for a coal gasification plant, coking operation, etc. Also, final cleaning plant 288, storage tank 310, and final preparation plant 313 are sources of clean coal for shipment to other locations. That is, the user need not be located at the mine as in the illustrated system.

In addition, as previously mentioned, the system can contain and collect gases such as methane released during mining of the coal. It can similarly accommodate gases generated or released during cleaning, transportation, or storage of the coal and/or handling of the ash.

As discussed above, one aspect of our invention has to do with the blending of additives with coal and other solids. Many mechanical arrangements can be employed for this purpose. In general all that is required is an agitator in a vessel to which the solids, the additive, and the 1,2-difluoroethane or fluorochlorocarbon liquid carrier can be supplied or a conventional screw conveyor, rotary mixer, pug mill, etc.

In this rudimentary system the solids, additives, and carrier are mixed until the additive is uniformly dispersed. The carrier is then evaporated into the ambient surroundings, a step which can be accelerated by supplying heat to the vessel.

FIG. 10 depicts a more sophisticated system 330. This system provides for recovery of the 1,2-difluoroethane or fluorochlorocarbon and can be readily incorporated into coal cleaning plants as described above and integrated systems as shown in FIGS. 8 and 9.

In system 330 distribution of the additive is accomplished in a unit 332 which, as described above, may be an agitator equipped vessel, screw conveyor, etc. If system 330 is associated with a coal cleaning plant or integrated system, the floats dryer can be bypassed and the drip dried floats transferred directly from the gravity separation operation to unit 332 as indicated by arrow 334. The 1,2-difluoroethane or fluorochlorocarbon carrier and additive are added directly to the unit as indicated by arrows 336 and 338. Alternatively, as shown by arrow 340, the additive and liquid can be premixed and then supplied to unit 332 as indicated by arrow 336.

The blended product is transferred as indicated by arrow 342 to a dryer of the character discussed above to remove the carrier liquid. This liquid is then recovered by any of the techniques described herein and recirculated, and the noncondensibles stripped from the carrier are rejected or recirculated to the dryer.

The additive can also be added to the conditioning tank or even the gravity separator in those applications of our invention involving a coal cleaning step. Dust suppressants, oxidation inhibitors, and other additives can conveniently be added to the clean coal and/or the rejects by this technique.

Referring again to the drawing, we have described hereinafter a variety of tests successfully conducted on a pilot plant scale. The plant in which these tests were made is shown diagrammatically in FIG. 11 and identified by reference character 350.

The pilot plant includes a storage tank 352 for the parting liquid. The tank can be connected to the inlet side of pump 354 by opening valves 356 and 358. With valves 359 and 360 also open and valve 362 closed, pump 354 pumps the liquid through a filter 364 into a 24 inch diameter by 6 foot long gravity separation vessel 366 until the vessel is filled to the level indicated by reference character 368. A valve 369 is opened while tank 366 is filled to equalize the pressure in storage tank 352 with that elsewhere in the system so that a vacuum will not be drawn in the tank.

After tank 366 is filled, valves 358, 359, and 360 are closed; and valve 362 is opened. This valve drains a second, similarly oriented and dimensioned vessel 370 in which clean coal is first drip dried and then dried with a heated gas.

If the coal is conditioned prior to the separation step, the 1,2-difluoroethane or fluorochlorocarbon parting liquid or the liquid plus a surface active agent and any other additive are mixed with the coal by hand in a drum. The coal, conditioned or not, is placed in a hopper 371 and transferred through a valve 372 into a hand-cranked screw conveyor 374. The screw conveyor discharges the coal into the bath 376 of parting liquid.

As the separation of the coal and rejects proceeds, the floats are skimmed from the body 376 of parting liquid and transferred to drying vessel 370 by a motor driven screw conveyor 380.

Valves 362, 382, 383, and 356 are open, and pump 354 is energized, as this occurs. The parting liquid draining from vessel 370 is accordingly pumped through filter 384 back into storage tank 352. At the end of the separation step the drain valve 360 from gravity separation vessel 366 is also opened and the liquid in it drained and pumped through filter 364 to storage tank 352.

The solids in tanks 366 (sinks) and 370 (floats) are trapped on 140 mesh screens 385 and 386 in the bottoms of tanks 366 and 370, respectively. Filters 364 and 384 trap three micron and larger particles which pass through the screens.

Valves 387 and 388 are open throughout the coal separation process. Saturated parting liquid vapor flows through these valves to a shell and tube condenser 390 and is condensed, using water as a cooling liquid. The condensed liquid is pumped to storage tank 352 through valves 392 and 356 by pump 354.

After the parting liquid has drained from tanks 366 and 370, a Roots blower 394 is energized; and hot water (ca. 140° F.) is circulated through the shell side of a shell and tube type heat exchanger 396. Parting liquid vapor is first circulated through the tube side of heat exchanger 396 by the blower to superheat it and then through filters 364 and 384 and through the solids in tanks 366 and 370 to dry the solids trapped on screens 385 and 386 and on the filters.

Noncondensibles and any vapor which is not condensed in condenser 390 are compressed by a diaphragm compressor 398 and pumped to a pipeline condenser 400. Here, the remaining parting liquid is condensed. The noncondensibles are rejected to the surrounding environment through a valve 402 provided to maintain pressure in the system. The condensate flows through a float valve 404, provided for the same purpose, and is returned to storage tank 352.

After the solids have been dried the bottoms of tanks or vessels 366 and 370 are opened and screens 385 and 386 removed, discharging the coal and rejects into separate receptacles (not shown). Filters 384 and 364 are removed. The coal trapped on filter 384 is combined with the coal from drip dry tank 370, and the rejects trapped on filter 364 are combined with those from gravity separation vessel 366. The solids are weighed and subjected to proximate analyses, etc. in accord with the test procedures set forth below.

Pilot plant 350 also demonstrates that coal can be readily transported in a slurry as discussed above. The coal is moved in this manner from separator 366 to drip dry tank 370.

The examples which follow describe representative tests which illustrate various facets of our novel coal cleaning and other processes.

For the sake of convenience the bulk of these tests were made on a bench scale basis.

In the bench tests a raw coal sample is quartered as prescribed by ASTM Standard No. D2013-72 into two or more kilogram lots. One lot is employed to characterize the raw coal as to size consist and bulk water content and for a complete proximate analysis which furnishes a standard for comparison.

The samples are stored in airtight containers until tested.

At the time of the bench test, the coal is, in some cases, first mixed with the parting liquid or the latter plus a surface active agent for 2-30 seconds to form a slurry containing 50-80 percent solids.

Separation is effected in one liter of the selected parting liquid in a six-inch diameter container at room temperature (65°-72° F.). The coal is transferred to the container in batches of 25-50 grams and briefly stirred.

The clean coal and the rejects are recovered separately from the parting liquid which is then filtered to recover any middlings which may be present (the "middlings" are those fragments which do not report to the sinks or the floats usually because they are very small in size and of almost the same specific gravity as the parting liquid).

The three phases are separately air dried. A material balance is made, and proximate analyses are made of the coal or the coal and the middlings.

If the water content of the coal is desired, that phase is not dried. It is instead placed in a flask and heated at a temperature of 30° C. until the parting liquid is completely evaporated. The sample is then weighed, heated at 100° C. in a vacuum oven until the free water evaporates, and reweighed. The difference is the weight of the water content.

Variations in the basis bench test procedure just described will be discussed in the examples in which they are introduced.

To more nearly duplicate a commercial operation, tests are also run in the pilot plant 350 described above. Samples of up to about 1,000 pounds are employed; and the cleaning rate is six-eight tons per hour.

Any surface active agents which are to be employed are first mixed with the parting liquid. The coal is then added on an approximately equal weight basis, forming a stiff, moist mixture. This mixture is batched into the pilot plant feed hopper 371 described above.

Dried coal recovered from the pilot plant is quartered in accord with ASTM Standard D2013-72, providing samples for proximate and other analyses.

The tables which are included in the examples are for the most part self-explanatory. However, the significance of two entries may not be readily apparent. These are "BTU Yield" and "percent reduction per million BTU's".

BTU Yield is determined by the formula:

$$\frac{\text{BTU/lb of clean coal}}{\text{BTU/lb of run-of-mine coal}} \times \text{Weight Yield in percent}$$

BTU Yield shows what percent of a run-of-mine coal's heating value can be sold at the analysis constituted by the figures in a given column in the tables which follow.

Taken with the figures indicative of reduction in sulfur and ash content and the amount of coal reporting to the sinks, BTU Yield is indicative of the effectiveness of the coal cleaning process.

If the BTU Yield is low, the other figures will show whether this is attributable to the removal of pyritic sulfur and/or dissolved organic material to the refuse (desirable) or whether the coal is being misplaced to the rejects (undesirable).

Conversely, if the BTU Yield is high, the sulfur and ash reduction figures will show whether this is attributable to the lack of pyrites and/or dissolved organic material in the rejects or to the efficiency of the operation in separating foreign matter from the raw coal.

In both cases the BTU Yield is valuable because it is a direct indicator of the per BTU cost of mining and recovering the coal. Coupled with sulfur and ash reduction, it is also indicative of the cost of handling refuse from the combustion process and of maintaining the sulfur level in the combustion products at an acceptable level.

Percent reduction per million BTUs can be calculated for ash and for total, pyritic, and organic sulfur. The figure is calculated by the formula:

$$\left[1 - \frac{y \text{ lbs}/10^6 \text{ BTU in clean coal}}{z \text{ lbs}/10^6 \text{ BTU in raw coal}}\right] \times 100$$

where y is pounds of ash, sulfur, etc. in the clean coal and z is the same for the raw or uncleaned coal. Percent reduction/$10^6$ BTU is a significant value because it relates ash and sulfur content to product BTU; and BTUs or fixed carbon, not pounds, are what is of value to the customer.

In the results reported in the examples all percentages are by weight unless otherwise indicated. All quantitative results are reported on a moisture-free basis.

Complete proximate analyses are not made in all cases, and this is reflected in the data tabulated in the examples. Such analyses are expensive and time consuming; and it is not necessary to make a complete analysis of the coal from each and every run because reduction in ash content, standing alone, is a good measure of the efficiency of a coal cleaning process.

EXAMPLE I

To demonstrate the effectiveness of our novel process in its most basic or elementary form, a bench scale test as described above was run at a specific gravity of 1.50 on Upper Freeport coal having a size consist of $\frac{3}{8}$ inch×0 and a moisture content of 6.5 percent (nominal). The size distribution of the particles in the sample was as follows:

+$\frac{3}{8}$ inch: 7.5 percent
$\frac{3}{8}$×5 m: 27.7 percent
5 m×10 m: 21.7 percent
10 m×30 m: 29.9 percent
30 m×60 m: 10.8 percent
60 m×100 m: 1.6 percent
−100 m: 1 percent Trichlorofluoromethane ($CCl_3F$) without additives was used as the parting liquid.

The ash content of the coal was reduced from 35.37 to 13.10 percent in the test, showing that a major part of the foreign matter had been separated from the coal. More ash could have been removed by reducing the size of the larger particles. They were sufficiently large that all of the ash had not been liberated from the coal itself.

The test is also significant in that the coal which was used had a moisture content much higher than that which is acceptable if the coal is to be cleaned by processes such as described in the Tveter patent identified above.

EXAMPLE II

To demonstrate that fluorochlorocarbon parting liquids other than trichlorofluoromethane can be used, the test described in Example I was repeated, using $CClF_2CClF_2$ (dichlorotetrafluoroethane) as the parting liquid.

In this test the ash content of the product coal was 13.0 percent which is virtually indistinguishable from the result obtained in the test described in Example I. The weight yield was a slightly lower 56.6 percent.

The test shows that trichlorofluoromethane is not the only one of the listed fluorochlorocarbons which can be used in the gravity separation of the coal from foreign material.

EXAMPLE III

A test as described in Example I was made to demonstrate the advantages of adding a surface active agent to the parting liquid. The results are compared to those obtained by Warner Laboratories, Inc., Cresson, Pa. in a standard washability study of the coal in Table 4 below.

The coal was that from the Upper Freeport seam (see Examples I and II). The parting liquid was trichlorofluoromethane, and about two pounds of surface active agent per ton of coal was employed. The particular surface active agent selected for the test was Pace Perk. As discussed above this is an ionic surface active agent which consists primarily of salts of dodecylbenzenesulfonic acid. The surface active agent was mixed with the parting liquid before the coal was added.

TABLE 4

|  | Run-of-mine Coal | Washability Study | Present Invention |
|---|---|---|---|
| Volatile Matter % | 28.42 |  | 34.77 |
| Fixed Carbon % | 46.03 |  | 59.55 |
| Ash % | 25.55 | 8.9 | 5.68 |
| lbs/m BTU | 23.5 |  | 3.98 |
| % Red'n/m BTU |  |  | 83 |
| Total Sulfur % | 1.46 | 0.95 | 0.52 |
| lbs/m BTU | 1.34 |  | 0.36 |
| % Red'n/m BTU |  |  | 72.8 |
| Pyritic Sulfur % | 1.09 |  | 0.16 |
| lbs/m BTU | 1.00 |  | 0.11 |
| % Red'n/m BTU |  |  | 88.8 |
| Organic Sulfur % | 0.35 |  | 0.32 |
| lbs/m BTU | 0.32 |  | 0.22 |
| % Red'n/m BTU |  |  | 30 |
| BTU/lb | 10,891 |  | 14,262 |
| BTU/lb (MAF) | 14,629 |  | 15,121 |
| Weight Yield % |  | 64.9 | 68.5 |
| BTU Yield % |  |  | 89.7 |
| Specific Gravity* |  | 1.55 | 1.51 |
| Moisture (input) | 7.1 |  | 7.1 |
| Coke Button** | 7 |  | 8.5 |
| Recovered Coal |  |  | 2.18 |

TABLE 4-continued

|  | Run-of-mine Coal | Washability Study | Present Invention |
|---|---|---|---|
| Moisture |  |  |  | m BTU = $10^6$ BTU
Red'n = reduction
MAF = moisture and ash free basis
*of the parting liquid
**The coke button value (or more formally, free swelling index) is a measure of cokability. FSI values range from 0–10 with the higher value being ideal. Coals with a FSI of less than 5 are essentially useless as coking coals.
The above notes also apply to the tables which follow.

A number of significant points are shown by the data tabulated above.

The ash content of the coal was not only reduced, it was reduced 36 percent below the level which it theoretically could be as determined by the standard washability study.

Total sulfur was reduced by 72.8 percent; this was 45 percent better than obtained in the standard washability study. Pyritic sulfur was almost completely separated from the coal, and there was a significant reduction in organic sulfur. As mentioned above, this is a result which no other coal cleaning process known to us is capable of achieving.

Furthermore, the cokability of the coal was significantly improved.

EXAMPLE IV

To demonstrate that other surface active agents can be employed and in varying amounts, bench scale coal cleaning tests were made using Upper Freeport coal with the size consist and other characteristics described in Example I.

The parting liquid was trichlorofluoromethane.

The surface active agents employed in the tests and the amounts used were:

TABLE 5

| Test | Surface Active Agent |
|---|---|
| A | Aerosol OT-100 (American Cyanamid)—anionic surfactant, dioctyl ester of sodium sulfosuccinic acid; 0.06 pounds per ton of coal |
| B | Same as in Test A; 0.6 pounds per ton of coal |
| C | Witcomine 235 (Witco Chemical Corp.)—cationic surfactant, 1-polyaminoethyl-2n-alkyl-2-imidazoline; three pounds per ton of coal |
| D | Same as Test C; 0.03 pounds per ton of coal |
| E | Same as Tests A and B; 0.033 pounds per ton of coal plus No. 6 fuel oil, 0.67 pounds per ton of coal |

The results of tests A–E are tabulated in Table 6 below.

TABLE 6

|  | Run-of-mine Coal | A | B | C | D | E |
|---|---|---|---|---|---|---|
| Volatile Matter % | 26.09 |  |  | 34.23 | 33.09 |  |
| Fixed Carbon % | 37.34 |  |  | 58.01 | 54.18 |  |
| Ash % | 35.57 | 8.46 | 6.55 | 7.76 | 12.73 | 9.33 |
| lbs/m BTU | 40.1 |  |  | 5.58 | 9.78 |  |
| % Red'n/m BTU |  |  |  | 86.1 | 75.6 |  |
| Total Sulfur % | 1.55 |  |  | 0.91 | 1.15 |  |
| lbs/m BTU | 1.70 |  |  | 0.65 | 0.88 |  |
| % Red'n/m BTU |  |  |  | 61.5 | 48.0 |  |
| Pyritic Sulfur % | 1.22 |  |  | 0.35 | 0.51 |  |
| lbs/m BTU | 1.33 |  |  | 0.25 | 0.39 |  |
| % Red'n/m BTU |  |  |  | 81.1 | 70.5 |  |
| Organic Sulfur % | 0.31 |  |  | 0.52 | 0.58 |  |
| lbs/m BTU | 0.34 |  |  | 0.37 | 0.44 |  |
| % Red'n/m BTU |  |  |  |  |  |  |
| BTU/lb | 9,128 |  |  | 13,913 | 13,010 |  |
| BTU/lb (MAF) | 14,391 |  |  | 15,083 | 14,908 |  |
| Weight Yield % |  | 55.0 | 52.3 | 51.8 | 57.1 | 52.9 |
| BTU Yield % |  |  |  | 79.0 | 81.4 |  |
| Specific Gravity |  | 1.51 | 1.51 | 1.51 | 1.51 | 1.51 |

The data in Table 6 shows that the particular surface active agent used is not critical, that both anionic and cationic materials are satisfactory, and that the agent need not be one which would conventionally be considered a surfactant.

The tabulated data also shows that the amount of surface active agent can be varied by as much as two orders of magnitude (depending upon the particular agent employed). The larger amounts in general increase the efficiency of the cleaning process though not in direct proportion to the amount used.

EXAMPLE V

In another pair of tests showing that the surface active agents we employ need not be conventional surfactants, Ohio No. 9 coal with a 60 mesh×0 size consist was cleaned using the bench scale procedure described above.

The parting liquids were:
Test F—$CCl_3F$ plus Cal-Supreme, 0.1 percent by volume, and
Test G—$CCl_3F$ plus 5 percent by volume No. 4 fuel oil.

The results of the tests are shown in Table 7.

TABLE 7

|  | Run-of-mine Coal | Test F | Test G |
|---|---|---|---|
| Ash % | 24.82 | 9.52 | 12.61 |
| % Red'n/m BTU |  | 68.0 | 58.5 |
| Total Sulfur % | 6.73 | 2.88 | 3.76 |
| % Red'n/m BTU |  | 62.8 | 54.2 |
| Pyritic Sulfur % | 4.34 | 1.07 | 1.02 |
| % Red'n/m BTU |  | 76.4 | 80.6 |
| Organic Sulfur % | 2.31 | 1.80 | 2.68 |
| % Red'n/m BTU |  | 43.4 | 5.1 |
| BTU/lb | 10,359 | 12,877 | 12,649 |
| Weight Yield % |  | 62.8 | 60.5 |
| BTU Yield % |  | 77.6 | 76.5 |
| Moisture % | 6.5 | 6.0 | 6.0 |

Both the No. 4 fuel oil and the cationic surfactant were effective with the latter proving to be somewhat more so in this particular test.

EXAMPLE VI

It was pointed out above that more efficient cleaning can in some, if not all, cases be obtained if the slurry of coal, 1,2-difluoroethane or fluorochlorocarbon, and surface active agent is agitated before the gravity separation of the coal is effected.

This is shown by a test which duplicated test B, Example IV except that the slurry of coal and parting liquid (which contained 60 percent by weight solids) was mechanically agitated using a blender for two minutes before gravity separation was effected. The blending action did not reduce the size consist significantly.

The results of this test, identified as "H", are compared to those obtained in Test B in Table 8 below.

TABLE 8

|  | Run-of-mine Coal | Test B | Test H |
|---|---|---|---|
| Volatile Matter % | 26.09 |  | 36.01 |
| Fixed Carbon % | 37.34 |  | 57.73 |
| Ash % | 35.57 | 6.55 | 6.26 |
| lbs/m BTU | 40.1 |  | 4.4 |
| % Red'n/m BTU |  |  | 88.9 |
| Total sulfur % | 1.55 |  | 0.87 |
| lbs/m BTU | 1.70 |  | 0.62 |
| % Red'n/m BTU |  |  | 63.7 |
| Pyritic Sulfur % | 1.22 |  | 0.31 |
| lbs/m BTU | 1.33 |  | 0.22 |
| % Red'n/m BTU |  |  | 83.5 |
| Organic Sulfur % | 0.31 |  | 0.50 |
| lbs/m BTU | 0.34 |  | 0.35 |
| % Red'n/m BTU |  |  |  |
| BTU/lb | 9,128 |  | 14,113 |
| BTU/lb (MAF) | 14,391 |  | 15,056 |
| Weight Yield % |  | 52.3 | 52.3 |
| BTU Yield % |  |  | 80.9 |
| Specific Gravity |  | 1.51 | 1.51 |

As shown by the tabulated data, agitation of the coal and parting liquid slurry resulted in a further, significant reduction in the ash content of the coal without reducing the weight yield or otherwise adversely effecting the cleaning process.

EXAMPLE VII

As indicated above, our novel process has the capability of cleaning coal of different size consists.

This was demonstrated by repeating the test described in Example III after having first ground the coal to a size consist of 60 mesh×0. The results of the two tests are compared in Table 9.

TABLE 9

|  | Run-of-mine Coal | Example III Test | 60 Mesh × 0 Coal |
|---|---|---|---|
| Volatile Matter % | 28.42 | 34.77 | 36.61 |
| Fixed Carbon % | 46.03 | 59.55 | 57.84 |
| Ash % | 25.55 | 5.68 | 5.55 |
| lbs/m BTU | 23.5 | 3.98 | 3.89 |
| % Red'n/m BTU |  | 83 | 83.4 |
| Total Sulfur % | 1.46 | 0.52 | 0.73 |
| lbs/m BTU | 1.34 | 0.36 | 0.51 |
| % Red'n/m BTU |  | 72.8 | 61.8 |
| Pyritic Sulfur % | 1.09 | 0.16 | 0.10 |
| lbs/m BTU | 1.00 | 0.11 | 0.07 |
| % Red'n/m BTU |  | 88.8 | 93 |
| Organic Sulfur % | 0.35 | 0.32 | 0.59 |
| lbs/m BTU | 0.32 | 0.22 | 0.41 |
| % Red'n/m BTU |  | 30 |  |
| BTU/lb | 10,891 | 14,262 | 14,253 |
| BTU/lb (MAF) | 14,629 | 15,121 | 15,091 |
| Weight Yield % |  | 68.5 | 68.8 |
| BTU Yield % |  | 89.7 | 90.0 |
| Specific Gravity |  | 1.51 | 1.51 |
| Moisture (input) | 7.1 | 7.1 | 7.1 |
| Coke Button | 7 | 8.5 | 8 |
| Recovered Coal |  | 2.18 | 2.22 |
| Moisture |  |  |  |

The results were nearly the same and probably within the limits of experimental error. The significant point in this test is that there was essentially no loss in BTU Yield even though in one case (Example III) the particle size was ⅜ inch×0 and in the other 60 m×0.

EXAMPLE VIII

We also pointed out above that the specific gravity of the 1,2-difluoroethane and fluorochlorocarbons we employ as parting liquids can be readily adjusted in applications where this is advantageous. As an example, the specific gravity may be lowered to separate more ash from the coal in applications where the customer's specifications so dictate.

That the specific gravity of our parting liquids can be readily adjusted was demonstrated by a series of bench scale tests in which petroleum ether was mixed with trichlorofluoromethane in amounts which reduced the specific gravity of the mixtures to 1.47 and 1.43. These mixtures and trichlorofluoromethane alone, all with three pounds of Pace Perk per ton of coal, were used as parting liquids.

Upper Freeport coal with the size consist described in Example I was cleaned.

The results are tabulated in Table 10.

TABLE 10

|  | Run-of-mine Coal | Test Product, $CCl_3F$ s.g. 1.51 | Test Product, $CCl_3F$ mixture, s.g. 1.47 | Test Product, $CCl_3F$ mixture, s.g. 1.43 |
|---|---|---|---|---|
| Volatile Matter % | 26.09 | 36.75 | 37.36 | 36.31 |
| Fixed Carbon % | 37.34 | 55.36 | 56.34 | 58.11 |
| Ash % | 35.57 | 7.89 | 6.30 | 5.58 |
| lbs/m BTU | 40.1 | 5.67 | 4.46 | 3.9 |
| % Red'n/m BTU |  | 85.9 | 88.9 | 90.3 |
| Total Sulfur % | 1.55 | 0.98 | 0.93 | 0.92 |
| lbs/m BTU | 1.70 | 0.70 | 0.67 | 0.64 |
| % Red'n/m BTU |  | 58.6 | 60.7 | 62.2 |
| Pyritic Sulfur % | 1.22 | 0.53 | 0.37 | 0.40 |
| lbs/m BTU | 1.33 | 0.38 | 0.27 | 0.28 |
| % Red'n/m BTU |  | 71.4 | 80.0 | 79.0 |
| Organic Sulfur % | 0.31 | 0.43 | 0.54 | 0.50 |
| lbs/m BTU | 0.34 | 0.31 | 0.39 | 0.35 |
| % Red'n/m BTU |  | 9 |  |  |

|  | Run-of-mine Coal | Test Product $CCl_3F$ | Test Product, $CCl_3F$ mixture, | Test Product, $CCl_3F$ mixture |
|---|---|---|---|---|
| BTU/lb | 9,128 | 13,911 | 14,138 | 14,311 |
| BTU/lb (MAF) | 14,391 | 15,103 | 15,089 | 15,158 |
| Weight Yield % |  | 52.8 | 54.1 | 51.7 |
| BTU Yield % |  | 80.5 | 83.8 | 81.1 |
| Specific Gravity |  | 1.51 | 1.47 | 1.43 |

The data shows that the percentage of ash reduction increased as the specific gravity of the parting liquid was lowered. There was a corresponding beneficial increase in the percentage of sulfur reduction, and the removal of more ash and sulfur was accomplished without a sacrifice in BTU yield.

EXAMPLE IX

Numerous bench scale tests conducted in the manner described above show that our novel process is useful for cleaning coals in general as opposed to coal from a particular seam. Results of various tests involving coal from the Upper Freeport seam are described in the preceding examples, and results of exemplary tests involving other coals are tabulated in Table 11.

Trichlorofluoromethane plus 0.5 volume percent of Pace Perk was used as a parting liquid in cleaning the Midwestern (Illinois No. B 5 and Ohio No. 9) coals, and $CCl_3F$ was used alone as a parting liquid to clean the Appalachian (Lower Kittanning) coal.

TABLE 11

| | Lower Kittanning (5 mesh × 0) | | Illinois No. 5 (⅜ in. × 0) | | Ohio No. 9 (60 mesh × 0) | |
|---|---|---|---|---|---|---|
| | Run-of-mine Coal | Test Product | Run-of-mine Coal | Test Product | Run-of-mine Coal | Test Product |
| Ash % | 26.38 | 9.63 | 9.22 | 4.79 | 24.82 | 9.52 |
| % Red'n/m BTU | | 70.8 | | 60.6 | | 68.0 |
| Total Sulfur % | 1.46 | .73 | 1.89 | 1.32 | 6.73 | 2.88 |
| % Red'n/m BTU | | 60.2 | | 35.5 | | 62.8 |
| Pyritic Sulfur % | 1.05 | .25 | 1.22 | .74 | 4.34 | 1.07 |
| % Red'n/m BTU | | 81.0 | | 41.9 | | 76.4 |
| Organic Sulfur % | .39 | .46 | .65 | .54 | 2.31 | 1.80 |
| % Red'n/m BTU | | 6.0 | | 22.0 | | 43.4 |
| BTU/lb | 10,844 | 13,595 | 13,116 | 13,800 | 10,359 | 12,877 |
| Weight Yield % | | 67.9 | | 93.3 | | 62.8 |
| BTU Yield % | | 85.0 | | 98.2 | | 77.6 |
| Moisture % | 5.0 | 5.0 | 10.45 | 8.90 | 6.5 | 6.0 |

The data shows that our process can be employed to clean coals of widely divergent character. The run-of-mine ash contents of the coals, for example, vary by a ratio of 2.9:1. Also, the tabulated data again demonstrates that a fluorochlorocarbon alone can be used as a parting liquid in our process.

EXAMPLE X

A bench scale test conducted as described above and using trichlorofluoromethane plus Aerosol OT-100 (0.3 lbs/ton coal) as the parting liquid demonstrates that our novel process is so efficient that it can even be used to separate substantial amounts of ash and sulfur from the product coal of a modern hydrobeneficiation plant.

The coal employed was Pittsburgh No. 8 Washing Plant Product. It was ground to 5 mesh × 0 before it was cleaned.

The results of the test are shown in Table 12.

TABLE 12

| | Washing Plant Product Coal | Test Product |
|---|---|---|
| Ash % | 15.96 | 7.52 |
| % Red'n/m BTU | | 57.6 |
| Total Sulfur % | 4.30 | 3.85 |
| % Red'n/m BTU | | 10.4 |
| Pyritic Sulfur % | 2.70 | 1.74 |
| % Red'n/m BTU | | 35.5 |
| Organic Sulfur % | 1.59 | 2.10 |
| % Red'n/m BTU | | |
| BTU/lb | 12,375 | 13,740 |
| Weight Yield % | | 82.6 |
| BTU Yield % | | 91.7 |
| Moisture % | 6.0 | 6.0 |

In this test, the ash and sulfur contents of coal already cleaned in a modern facility were reduced by values of 57 and 10 percent with no loss of BTU Yield by cleaning the coal with our novel process.

EXAMPLE XI

Two representative bench scale tests as described above illustrate the capability of pure trichlorofluoromethane to effect a removal of organic sulfur from Ohio No. 9 coal and an enhancement of this property when 0.5 weight percent of Cal-Supreme surfactant is added to the parting liquid.

The size consist in both tests was 60 m × 0, and the moisture content of the raw coal was 6 percent.

The results of the tests are tabulated below.

TABLE 13

| | Raw Coal | Case I No Additive | Case II Cal-Supreme Additive |
|---|---|---|---|
| Ash % | 24.82 | 22.55 | 9.46 |
| % Red'n/m BTU | | 13.6 | 68.4 |
| Total Sulfur % | 6.73 | 5.39 | 2.69 |
| % Red'n/m BTU | | 23.6 | 65.4 |
| Pyritic Sulfur % | 4.34 | 3.06 | 0.97 |
| % Red'n/m BTU | | 32.8 | 78.7 |
| Organic Sulfur % | 2.31 | 2.27 | 1.69 |
| % Red'n/m BTU | | 6.3 | 47.2 |
| BTU/lb | 10,359 | 10,867 | 12,957 |
| Weight Yield % | | 56.6 | 59.5 |
| BTU Yield % | | 59.4 | 73.9 |

The foregoing are exemplary of a multitude of tests in which, by using a fluorochlorocarbon, alone and with various surface active agents, we have removed sulfur from a fresh coal sample to an extent which exceeds 100 percent of the sum of the pyritic (and sulfate) sulfur concentration in the original coal without undue loss of BTU yield. This is accomplished without change of the normal sink-float separation procedure.

Furthermore, organic sulfides and sulfones have been observed in the parting liquid residue by infrared techniques whereas, as indicated above, no other sink-float process of which we are aware causes organic sulfur reduction.

EXAMPLE XII

In an even more demanding test than that described in Example X, slurry pond coal was cleaned by our process. Heretofore, there has not been any way to recover coal from slurry ponds because of the small size of the particles and the high moisture content.

The size consist of the coal in the slurry pond was 85 percent less than 200 mesh and 67 percent less than 325 mesh.

Trichlorofluoromethane with approximately one pound of Aerosol OT-100 per ton of coal was used as the parting liquid.

In Table 14 below we have compared the raw slurry pond coal and the product coals obtained by cleaning that coal at input bed moistures of eight and 14 percent.

TABLE 14

| | Raw Slurry Pond Coal | Test Product Coal - 8% Moisture Input | Test Product Coal - 14% Moisture Input |
|---|---|---|---|
| Volatile Matter % | 22.60 | 28.01 | 27.43 |

TABLE 14-continued

|  | Raw Slurry Pond Coal | Test Product Coal - 8% Moisture Input | Test Product Coal - 14% Moisture Input |
| --- | --- | --- | --- |
| Fixed Carbon % | 47.75 | 66.71 | 66.24 |
| Ash % | 29.65 | 5.28 | 6.33 |
| lbs/m BTU | 29.1 | 3.64 | 4.43 |
| % Red'n/m BTU |  | 87.5 | 84.8 |
| Total Sulfur % | 0.85 | 0.81 | 0.80 |
| lbs/m BTU | 0.83 | 0.56 | 0.56 |
| % Red'n/m BTU |  | 32.5 | 32.5 |
| Pyritic Sulfur % | 0.41 | 0.19 | 0.16 |
| lbs/m BTU | 0.40 | 0.13 | 0.11 |
| % Red'n/m BTU |  | 67.5 | 72.5 |
| Organic Sulfur % | 0.39 | 0.56 | 0.58 |
| lbs/m BTU | 0.38 | 0.39 | 0.41 |
| % Red'n/m BTU |  |  |  |
| BTU/lb | 10,189 | 14,520 | 14,297 |
| BTU/lb (MAF) | 14,483 | 15,329 | 15,263 |
| Weight Yield % |  | 37.1 | 37.3 |
| BTU Yield % |  | 53 | 52.3 |
| Specific Gravity % |  | 1.50 | 1.50 |
| Raw Coal % (Input Moisture) |  | 8 | 14 |
| Product Coal % (Moisture) |  | 4.24 | 4.3 |
| Coke Button | 1 | 9 | 9 |

The recovered coal is highly marketable.

The cost of recovering and cleaning slurry pond coal as employed in the just described test is, conservatively calculated, $3.00 per input ton. On the other hand, the current F.O.B. market price for the product is at least $25.00 to $35.00 per ton, which shows that this application of our process is one of considerable economic importance.

This test is also significant because of the large amount of water that reported to the sinks in the cleaning process. As shown in Table 14, this resulted in a reduction of water content from 14 to 4.3 percent. That is, without any additional steps, over two-thirds of the initially present water was removed from the coal.

That this large proportion of the water can be caused to report to the sinks is attributable to the novel 1,2-difluoroethane or fluorochlorocarbon and additive systems we employ as parting liquids. Because the parting liquids are essentially chemically inert under the process conditions, we can mix with them a surface active agent which will disrupt the water films on the surfaces of the coal particles and remove the water to the sinks.

This is opposite to what has heretofore been done in coal cleaning processes such as described in the Foulke et al patents identified above. Those processes employ parting liquids which, because of their chemical reactivity and/or high boiling points, cannot be recovered in amounts which make the process practical if they are allowed to directly contact the coal. Therefore, these processes use surfactants of a character which, instead of disrupting the water films on the coal particles, stabilize these films so they will isolate the coal particles from the parting liquid. No water is removed from the coal by these processes, and additional processing may be necessary to reduce the moisture content of the product to an acceptable level.

EXAMPLE XIII

The following tests are representative of many which show that the results described and discussed in the preceding examples are equally attainable when coal is cleaned by our process on a much larger scale.

The tests are conducted in the pilot plant illustrated in FIG. 11 using the pilot plant test procedure described above.

The coal was that described in Example I. Trichlorofluoromethane with one pound of Aerosol OT-100 per ton of coal was used as the parting liquid.

The test results are reported in Table 15. They are compared with the results obtained in the 1.51 specific gravity parting liquid test described in Example VIII. The latter was a bench scale test, but otherwise the same.

Throughputs in the range of six tons per hour were employed. Six hundred and ten pounds of coal were cleaned in the first test and 582 pounds in the second test.

TABLE 15

|  | Run-of-mine coal | 610 pound Test | 582 pound Test | Example VIII Test |
| --- | --- | --- | --- | --- |
| Volatile Matter % | 26.09 | 36.63 | 26.62 | 36.75 |
| Fixed Carbon % | 37.34 | 55.72 | 56.08 | 55.36 |
| Ash % | 35.57 | 7.65 | 7.30 | 7.89 |
| lbs/m BTU | 40.1 | 5.5 | 5.2 | 5.67 |
| % Red'n/m BTU |  | 86.3 | 87 | 85.9 |
| Total Sulfur % | 1.55 | 0.88 | 0.88 | 0.98 |
| lbs/m BTU | 1.70 | 0.63 | 0.63 | 0.70 |
| % Red'n/m BTU |  | 62.8 | 63 | 58.6 |
| Pyritic Sulfur % | 1.22 | 0.67 | 0.56 | 0.53 |
| lbs/m BTU | 1.33 | 0.48 | 0.40 | 0.38 |
| % Red'n/m BTU |  | 64 | 70.2 | 71.4 |
| Organic Sulfur % | 0.31 | 0.19 | 0.28 | 0.43 |
| lbs/m BTU | 0.34 | 0.14 | 0.2 | 0.31 |
| % Red'n/m BTU |  | 62 | 44.5 | 9 |
| BTU/lb | 9,128 | 13,096 | 14,009 | 13,911 |
| BTU/lb (MAF) | 14,391 | 15,058 | 15,112 | 15,103 |
| Weight Yield % |  | 54.4 | 54.8 | 52.8 |
| BTU Yield % |  | 83.0 | 84.1 | 80.5 |
| Specific Gravity |  | 1.51 | 1.51 | 1.51 |

The data shows that the results of the two pilot plant runs were consistent and, if anything, superior to those obtained in the bench scale tests although the differences may be within the level of experimental error.

Tests on other coals produced similar results. Those obtained in cleaning Lower Kittanning coal and the hydrobeneficiation plant product (Example X) are typical.

The coal and parting liquids were as described in Example X except that the hydrobeneficiation product had a size consist of 5 mesh×0, and the Lower Kittanning coal had a size consist of ⅜ inch×0 rather than 30 mesh×0 as in the bench scale test.

Results of the tests appear in Table 16.

TABLE 16

|  | Lower Kittanning | | Hydrobeneficiation Product Coal | |
| --- | --- | --- | --- | --- |
|  | Bench Scale | Pilot Plant | Bench Scale | Pilot Plant |
| Ash % | 9.63 | 10.73 | 7.52 | 6.08 |
| % Red'n/m BTU | 70.8 | 67.4 | 57.6 | 64.0 |
| Total Sulfur % | .73 | .77 | 3.85 | 3.53 |
| % Red'n/m BTU | 60.2 | 57.9 | 10.4 | 29.4 |
| Pyritic Sulfur % | .25 | .25 | 1.74 | 1.49 |
| % Red'n/m BTU | 81.0 | 81.0 | 35.5 | 51.0 |
| Organic Sulfur % | .46 | .50 | 2.10 | 2.02 |
| % Red'n/m BTU | 6.0 |  |  |  |
| BTU/lb | 13,595 | 13,535 | 13,740 | 13,964 |
| Weight Yield | 67.9 | 70.5 | 82.6 | 80 |
| BTU Yield | 85.0 | 88.0 | 91.7 | 89.5 |
| Moisture % | 5.0 | 5.0 | 6.0 | 6.0 |

Table 16 shows that the results of the pilot plant and bench scale tests involving the cleaning of Lower Kittanning and hydrobeneficiated coals were very much alike. Again, the pilot plane was slightly superior to the bench apparatus.

EXAMPLE XIV

It was pointed out above that our invention includes a novel process for uniformly dispersing additives on coal and that one application of this process is the dustproofing of coal.

A goal in dustproofing coal is to agglomerate the smaller particles into larger ones, thereby making the product easier to handle, less subject to attrition in storage, etc.

To illustrate how coal can be dedusted in accord with the principles of the present invention, No. 6 fuel oil was dissolved in trichlorofluoromethane with stirring at room temperature in a ratio of one part of fuel oil to 250 parts of fluorochlorocarbon.

The liquid was mixed with coal which was ground to a 30 mesh×0 size consist in amounts providing approximately two pounds of fuel oil per ton of coal.

The coal was first drip dried, and the remaining fluorochlorocarbon was then removed by evaporation.

The size consists of the treated and untreated coals are compared in Table 17.

In the table which follows, the numerical entries are the weight percent of the sample which passed through a sieve of the mesh size indicated on the same horizontal line as the numerical entry.

TABLE 17

| Sieve Mesh Size | Untreated | Treated |
| --- | --- | --- |
| 30 × 0 | 98.5 | 96.6 |
| 60 × 0 | 71.7 | 58.0 |
| 100 × 0 | 53.4 | 25.9 |
| 200 × 0 | 36.1 | 4.7 |

The tabulated data shows that the treatment effectively reduced the proportion of small particles. Furthermore, the dedusted particles that did pass the finer mesh sieves had a marked tendency to agglomerate and to support an angle of repose exceeding 90°.

EXAMPLE XV

As discussed above, another application of our novel coating and additive dispersing process is the waterproofing of coal to keep it from spontaneously igniting following the absorption of water and/or to keep the lumps or particles from freezing together under low temperature conditions.

The effectiveness of our process in waterproofing coal is demonstrated by a test in which a kilogram of a Wyoming coal with a size consist of ¾ inch×0 and an inherent moisture content of thirty percent was completely dried in a vacuum oven at 105° C. The coal was divided into two samples, and one was immediately transferred to a gastight container.

The second sample was with equal alacrity immersed in a mixture of 97 percent by volume trichlorofluoromethane and 3 percent by volume No. 6 fuel oil. The mixture was stirred for 0.5 minute to promote intimate contact between the coal and the mixture of carrier and waterproofing agent.

The coal was then extracted from the bath and the trichlorofluoromethane removed by evaporation.

Both the treated and untreated samples were immersed in deionized water under ambient conditions. One hour later the water was removed by shaking the samples of coal on a screen.

The water recovered from the coal was compared to the amount present at the beginning of the test, the difference being water absorbed on and adsorbed by the coal.

The untreated coal acquired a 50 percent moisture content almost instantaneously and equilibrated through air drying to a 30 percent moisture content. In contrast, the shake dried, treated sample had a moisture content of only twenty percent after the one hour submersion.

When air dried to the same extent as the first sample, i.e., to 30 percent moisture, the treated sample had only 1.5 percent absorbed moisture as determined by vacuum oven drying at 105° C. This indicated that the porous structure of the coal had, indeed, been inhibited from carrying moisture. The level was well below the limit of 5 percent needed to insure against spontaneous combustion and freezing of the coal into a mass.

EXAMPLE XVI

Another previously discussed aspect of our invention is the conversion of coal particles into briquettes and similar artifacts which facilitate transportation, reduce storage losses, and permit proper gas flow through the system in application such as coking.

Exemplary briquettes were made by immersing 60×0 mesh Pittsburgh coal in a mixture of 97 percent volume trichlorofluoromethane and 3 percent No. 6 fuel oil and manually stirring the mixture for less than a minute.

The coal was recovered and the trichlorofluoromethane removed by evaporation, leaving the coal coated with the fuel oil in an amount of approximately one gallon of fuel oil per ton of coal.

The coated coal was transferred to a die and compacted into one-inch diameter by two-inch long cylinders under 3000 pounds pressure by a hydraulic machine.

Without further treatment the briquettes were dropped onto a concrete floor from a height of four feet.

This did not cause any substantial damage to the briquettes.

Numerous embodiments of our invention have been described above in varying degrees of detail. However, the invention may be embodied in still other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent of the United States is:

1. A method of moving solids in lump or particulate form from place-to-place which comprises the steps of: forming a slurry of said solids in a liquid carrier which contains a compound selected from the group consisting of 1,2-difluoroethane, 1-chloro-2,2,2-trifluoroethane, 1,1-dichloro-2,2,2-trifluoroethane, dichlorofluoromethane, 1-chloro-2-fluoroethane, 1,1,2-trichloro-1,2,2-trifluoroethane, 1,1-dichloro-1,2,2,2-tetrafluoroethane, and trichlorofluoromethane; pumping said slurry under an ambient or near ambient pressure from one to the other of two locations; heating said slurry at the second of said locations to a temperature above that prevailing at said second location and sufficiently high to so evaporate the liquid carrier as to separate even that part of the carrier absorbed on the solids from the solids; and thereafter stripping carrier in the gaseous phase from said solids to thereby recover said carrier.

2. A method of moving solids according to claim 1 in which the liquid carrier is present in the slurry in an amount ranging from 40 to 99 percent based on the total weight of the slurry.

3. A method of moving solids in lump or particulate form from place-to-place which comprises the steps of: forming a slurry of said solids in a liquid carrier which contains a compound selected from the group consisting of 1,2-difluoroethane, 1-chloro-2,2,2-trifluoroethane, 1,1-dichloro-2,2,2-trifluoroethane, dichlorofluoromethane, 1-chloro-2-fluoroethane, 1,1,2-trichloro-1,2,2-trifluoroethane, 1,1-dichloro-1,2,2,2-tetrafluoroethane, and trichlorofluoromethane; pumping said slurry from one to the other of two locations; heating said slurry at the second of said locations to a temperature sufficiently high to evaporate the liquid carrier and thereby separate it from the solids; and thereafter stripping carrier in the gaseous phase from said solids to thereby recover said carrier, said solids being drip dried at the second of said locations prior to said heating step to thereby reduce the amount of carrier required to be removed from the solids by evaporation.

4. A coal handling and processing system which includes: means for forming a liquid slurry of coal to be cleaned, pumping means for effecting a flow of said slurry to a cleaning station, separator means at said cleaning station for effecting a gravity separation of the coal by a heavy liquid, and means for transporting the separated coal in slurry with said heavy liquid to a terminus.

5. A coal handling and processing system according to claim 4 together with means at said terminus for recovering the parting liquid from the slurry.

6. Coal cleaning and handling apparatus according to claim 4 together with means for returning parting liquid from said cleaning station to said pumping means to form the slurry of coal to be cleaned.

7. Coal cleaning and handling apparatus according to claim 4 including a crusher upstream of said pumping means for reducing the size consist of the mined coal.

8. A coal handling and processing system which includes: means for forming a liquid slurry of coal to be cleaned, pumping means for effecting a flow of said slurry to a cleaning station, separator means at said cleaning station for effecting a gravity separation of the coal by a parting liquid, a second cleaning station, means for conveying the slurry of separated coal from the first-mentioned cleaning station to said second cleaning station, means at said second cleaning station for reducing the size consist of the coal, separation means at said second cleaning station for thereafter effecting a second gravity separation of the coal and foreign material mixed therewith, and means for transferring the coal recovered at said second cleaning station to a terminus.

9. A coal handling and processing system according to claim 8 in which the first of said stations is located in a mine and the second of the cleaning stations is located aboveground, thereby reducing the amount of solid material that must be transferred from the mine.

* * * * *

UNITED STATES PATENT AND TRADEMARK OFFICE
CERTIFICATE OF CORRECTION

PATENT NO. : 4,265,737

DATED : May 5, 1981

INVENTOR(S) : SMITH ET AL.

It is certified that error appears in the above-identified patent and that said Letters Patent is hereby corrected as shown below:

Column 5, line 31, "annula" should be --annual--.

Column 7, line 52, "use" should be --us--.

Column 9, line 31, "0.2" should be --0.02--.

Column 16, line 3, "out" should be --our--.

Column 17, line 10, "bgeneficiation" should be --beneficiation--.

Column 17, line 43, "group" should be --ground--.

Column 18, line 36, "not" should be --no--.

UNITED STATES PATENT AND TRADEMARK OFFICE
CERTIFICATE OF CORRECTION

PATENT NO. : 4,265,737

DATED : May 5, 1981

INVENTOR(S) : SMITH ET AL.

It is certified that error appears in the above-identified patent and that said Letters Patent is hereby corrected as shown below:

Column 19, line 53, "given" should be --give--.

Column 20, line 50, "(14()" should be --(14)--.

Column 21, line 23, the "comma" should be a --period--.

Column 22, line 10, "residue" should be --reside--.

Column 22, line 38, "econological" should be --ecological--.

Column 29, line 34, "200" should be --220--.

Column 30, line 48, "Numeral" should be --Number--.

Column 31, line 33, "200" should be --220--.

Column 33, line 20, after "Pittsburgh" omit the --period--.

UNITED STATES PATENT AND TRADEMARK OFFICE
CERTIFICATE OF CORRECTION

PATENT NO. : 4,265,737

DATED : May 5, 1981

INVENTOR(S) : SMITH ET AL.

It is certified that error appears in the above-identified patent and that said Letters Patent is hereby corrected as shown below:

Column 41, lines 42-43, "Run-of-Mine Coal" should be positioned directly above "28.42".

Column 41, lines 61-62, The table endline should be below "Moisture".

Column 42, lines 38-42, endline, captions, and begin-line should be omitted.

Signed and Sealed this

Third Day of May 1983

[SEAL]

Attest:

Attesting Officer

GERALD J. MOSSINGHOFF

Commissioner of Patents and Trademarks